US008113945B2

(12) United States Patent
Yoshizawa

(10) Patent No.: US 8,113,945 B2
(45) Date of Patent: Feb. 14, 2012

(54) PLAYING METHOD OF CARD GAME AND GAME MACHINE

(75) Inventor: Kazumasa Yoshizawa, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 482 days.

(21) Appl. No.: 12/357,763

(22) Filed: Jan. 22, 2009

(65) Prior Publication Data

US 2009/0227359 A1 Sep. 10, 2009

Related U.S. Application Data

(60) Provisional application No. 61/034,363, filed on Mar. 6, 2008.

(51) Int. Cl.
*A63F 13/00* (2006.01)

(52) U.S. Cl. ........................................... 463/22; 463/40

(58) Field of Classification Search ............... 463/15–25
See application file for complete search history.

(56) References Cited

U.S. PATENT DOCUMENTS

| | | | | |
|---|---|---|---|---|
| 5,248,142 | A * | 9/1993 | Breeding | 273/138.1 |
| 5,356,140 | A * | 10/1994 | Dabrowski et al. | 463/12 |
| 5,711,525 | A | 1/1998 | Breeding | |
| 6,299,533 | B1 * | 10/2001 | Parra et al. | 463/17 |
| 6,592,459 | B2 * | 7/2003 | Parra et al. | 463/17 |
| 6,789,801 | B2 | 9/2004 | Snow | |
| 6,874,786 | B2 | 4/2005 | Bruno et al. | |
| 7,736,221 | B2 * | 6/2010 | Black et al. | 463/13 |
| 2004/0087355 | A1 * | 5/2004 | Toyoda | 463/16 |
| 2005/0208993 | A1 * | 9/2005 | Yoshizawa et al. | 463/20 |
| 2006/0142079 | A1 * | 6/2006 | Ikehara et al. | 463/27 |
| 2007/0004512 | A1 * | 1/2007 | Toyoda | 463/30 |

* cited by examiner

*Primary Examiner* — Ha Tran T Nguyen
*Assistant Examiner* — Vongsavanh Sengdara
(74) *Attorney, Agent, or Firm* — NDQ&M Watchstone LLP

(57) ABSTRACT

A method of playing card games, according to the present invention, includes the steps of: (a) accepting participation of players; (b) determining banker's cards and players' cards, the players' cards being dealt to the players having accepted participation, from a first card set consisting of plural types of cards; (c) dealing the players' cards determined at the step (b) to the players having accepted participation; (d) in a case where the number of players having accepted participation exceeds a predetermined number of players, determining the players' cards to be dealt to the players having accepted participation in excess of the number of players, based upon cards excluding the banker's cards dealt based upon the first card set among a second card set that consists of cards identical to those of the first card set; (e) dealing the players' cards determined at the step (d) to the players having accepted participation in excess of the number of players; and (f) determining a winner or loser after comparing hands of the players' cards dealt to the players and a hand of the banker's cards.

11 Claims, 16 Drawing Sheets

PLAYING METHOD OF CARD GAME AND GAME MACHINE

CROSS-REFERENCE TO RELATED APPLICATIONS

This application claims priority of U.S. Provisional Application No. 61/034,363 filed on Mar. 6, 2008. The contents of this application are incorporated herein by reference in their entirety.

BACKGROUND OF THE INVENTION

1. Field of the Invention

The present invention relates to a method of playing card games and a game machine.

2. Description of the Related Art

Conventionally, table games such as poker or blackjack and baccarat are widely known which are performed by a plurality of players in gaming places such as Casinos. In recent years, a plenty of players have often enjoyed a variety of pokers such as a PAIGOW poker or a Caribbean Stud poker.

With the prevalence of gaming places and game arcades in recent years, game machines have been introduced which allow computers to take over a dealer in such games employing cards, such that players can casually enjoy the games as described above. In this game machine, the dealing of cards and the determination of what numbers or symbols of the dealt cards might be are executed by gaming machines executing programs. The players recognize what cards have been dealt by way of images of the cards displayed on the display devices such as liquid crystal displays, and perform game operation with the use of input devices. Such game machines are disclosed in US Published Patent Application No. 20070004512.

In addition, a game machine exists which is capable of accepting a side BET different from a normal BET. For example, in blackjack, in a case where one of the dealer's two cards, for example, a card "Ace" is faced up, the players can perform a side BET called "Insurance" in addition to a normal BET. In a case where "Insurance" is performed, the players can additionally make a first bet at half price. In a case where the dealer's hand is "Natural 21", the amount of bet, which is twice of the side BET (insurance), is paid back.

In the Caribbean Stud poker, for example, a side BET is accumulatively stored as a progressive jackpot. The players can acquire all or part of the progressive jackpots in accordance with an established hand when performing a side BET in addition to an ante (a normal BET). Games for accepting the side BET are disclosed in U.S. Pat. Nos. 6,789,801, 5,711,525, and 6,874,786, for example.

Further, a game machine also exist which is capable of performing a PAIGOW poker. The rules of the PAIGOW poker are different from those of other pokers. First, seven cards are dealt to each of a plurality of persons consisting of a banker and players, and each of them divides the seven cards into a group of five cards and a group of two cards. The hands of five cards are compared with each other among the banker and the players. Similarly, the hands of two cards are compared with each other. The winner or loser of the game is determined only when at least one of the players has won in both of the above hands. The procedures for dividing the dealt cards into two groups exist, whereby the players are required to adopt a strategy different from those of other pokers, which becomes a kind of amusing attractiveness of the game.

However, in these card game and game machine, in general, if gaming is performed in one group of cards (52 cards may include a joker), only a predetermined small number of players could be participate. In the PAIGOW poker, for example, seven cards are dealt to each person, and up to only seven persons including the dealer and the players could participate. Because of the limited space of the gaming places, further, not so many input devices could be installed corresponding to gaming tables. In view of this fact also, only a limited number of players can participate in the games performed on gaming tables. Therefore, a need exists for the advent of new methods of playing card games and game machines without any limitation to the number of participants in games.

The present invention has been made in view of the above-described problems. It is an object of the present invention to provide a method of playing card games and a game machine, having new entertainability, in which players can participate without a waiting time and which a large number of persons can use.

SUMMARY OF THE INVENTION

A first aspect of the present invention is a game machine, including a plurality of display devices provided corresponding to respective ones of a plurality of players; a plurality of input devices provided corresponding to respective ones of a plurality of players, for accepting entry for participation of the players; a memory for storing first card set data inclusive of plural types of card data, second card set data inclusive of card data identical to cards included in the first card set data, and the number of players accepting entry for participation by the input device; a controller for controlling the display device, the input device, and the memory, the controller being programmed to: (a) execute processing of accepting entry for participation from the input device; (b) determine banker's cards and players' cards, the players' cards being dealt to the players having accepted entry for participation from the input device, based upon the first card set data stored in the memory; (c) among the plurality of display devices, execute processing of displaying the players' cards determined in (b) on the display devices corresponding to the players having accepted entry for participation; (d) in a case where the number of players having accepted entry for participation stored in the memory exceeds a predetermined number of players, determine the players' cards to be dealt to the players having accepted entry for participation in excess of the number of players, based upon card data excluding the banker's cards dealt based upon the first card set data among the second card set data stored in the memory; (e) execute processing of displaying the players' cards determined in (d) on the display devices corresponding to the players having accepted entry for participation in excess of the number of players among the plurality of display devices; and (f) execute processing of determining a winner or loser after comparing hands of the players' cards dealt to the players and a hand of the banker's cards.

According to the first aspect of the present invention, for example, in a case where a predetermined limited number of players have already participated in given games, other players could not participate until a vacancy takes place. In addition, the number of participants could not be increased. According to the present invention, a dealer can use a plurality of card sets, thus allowing other players to participate the games partway without waiting for such a vacancy. Further, the number of participants can be increased, thus allowing a large number of persons to perform games and create a thriving atmosphere. The game machine of playing card games, having these new entertainabilities, can be provided.

A second aspect of the present invention is the game machine, further comprising a common display device used in common by the plurality of players, the controller being programmed to: (g) display the players' cards on the common display device on a player-by-player basis; (h) determine a payment, based upon a combination of cards included in the players' cards displayed on the common display device; and (i) give a payment to the players in accordance with the determined payment.

According to the second aspect of the present invention, for example, in a case where, in comparison with hands of the players who have participated in games, a payment is given to a player having a hand of the strongest combination among the compared hands, the players are allowed to perform games while they have an interest in competing against each other and its related payment in addition to an interest in competing against the dealer and its related payment. As the result, it is possible for the players to enhance excitement, and the game machine of playing card games, having new entertainability, can be provided.

A third aspect of the present invention is the game machine, wherein: the controller is programmed to: (j) execute processing of accepting a side BET different from a normal BET from the input device, the controller determining a payment, based upon a combination of the players' cards of the players having accepted the side BET, from among the players' cards in the processing of (h) and give a payment to the players having accepted the side BET in the processing of (i).

According to the third aspect of the present invention, for example, in addition to the competition in a base game and its related payment, the players participate simultaneously in other games in which the larger number of participants is and the more side BET is accumulated, so that the higher payment can be obtained. Thus, the players are allowed to enhance excitement for a higher payment, and the game machine of playing card games, having new entertainability, can be provided.

A fourth aspect of the present invention is a game machine, including: a plurality of display devices provided corresponding to respective ones of a plurality of players; a common display device used in common by the plurality of players; a plurality of input devices provided corresponding to respective ones of the plurality of players, for accepting entry for participation of the players; a memory for storing first card set data inclusive of plural types of card data, second card set data inclusive of card data identical to cards included in the first card set data, and the number of players having accepted entry for participation by the input device; a controller for controlling the display device, the input device, and the memory, the controller being programmed to: (a) execute processing of accepting entry for participation from the input device; (b) determine banker's cards and players' cards, the players' cards being dealt to the players having accepted entry for participation from the input device, based upon the first card set data stored in the memory; (c) among the plurality of display devices, execute processing of displaying the players' cards determined in (b) on the display devices corresponding to the players having accepted entry for participation; (d) in a case where the number of players having accepted entry for participation stored in the memory exceeds a predetermined number of players, determine the players' cards to be dealt to the players having accepted entry for participation in excess of the number of players, based upon card data excluding the banker's cards dealt based upon the first card set data among the second card set data stored in the memory; (e) execute processing of displaying the players' cards determined in (d) on the display devices corresponding to the players having accepted entry for participation in excess of the number of players among the plurality of display devices; (f) execute processing of determining a winner or loser after comparing hands of the players' cards dealt to the players and a hand of the banker's cards; (g) display the players' cards on the common display on a player-by-player basis; (h) determine a payment, based upon a combination of cards included in the players' cards displayed on the common display; and (i) give a payment to the players in accordance with the determined payment.

According to the fourth aspect of the present invention, for example, in a case where a predetermined limited number of players have already participated in given games, other players could not participate in the games until a vacancy takes place. In addition, the number of participants could not be increased. According to the present invention, a dealer can use a plurality of card sets, thus allowing other players to participate in the games partway without waiting for such a vacancy. Further, the number of participants can be increased, thus allowing a large number of persons to perform games and create a thriving atmosphere. The game machine of playing card games, having these new entertainabilities, can be provided. Further, in comparison with hands of the players who have participated in games, in a case where a payment is given to a player having a hand of the strongest combination among the compared hands, the players are allowed to perform games while they have an interest in competing against each other and its related payment in addition to an interest in competing against the dealer and its related payment. As the result, it is possible for the players to enhance excitement, and the game machine of playing card games, having new entertainability, can be provided.

A fifth aspect of the present invention is the game machine, wherein: the controller is programmed to: (j) execute processing of accepting a side BET different from a normal BET from the input device, the controller determining a payment, based upon a combination of the players' cards of the players having accepted the side BET, from among the players' cards in the processing of (h) and giving a payment to the players having accepted the side BET in the processing of (i).

According to the fifth aspect of the present invention, for example, in addition to a base game and its related payment, the players participate simultaneously in other games in which the larger number of participants is and the more side BET is accumulated, so that the higher payment can be obtained. Thus, the players are allowed to enhance excitement for a higher payment, and the game machine of playing card games, having new entertainability, can be provided.

A sixth aspect of the present invention is a game machine, including: a plurality of display devices provided corresponding to respective ones of a plurality of players; a common display device used in common by the plurality of players; a plurality of input devices provided corresponding to respective ones of the plurality of players, for accepting entry for participation of the players and a side BET; a memory for storing first card set data inclusive of plural types of card data, second card set data inclusive of card data identical to cards included in the first card set data, and the number of players accepting entry for participation by the input device; a controller for controlling the display device, the input device, and the memory, the controller being programmed to: (a) execute processing of accepting entry for participation from the input device and the side BET; (b) determine banker's cards and players' cards, the players cards being dealt to the players having accepted entry for participation from the input devices, based upon the first card set data stored in the memory; (c) among the plurality of display devices, execute processing of displaying the players' cards determined in (b) on the display devices corresponding to the players having accepted entry for participation; (d) in a case where the number of players having accepted entry for participation stored in the memory exceeds a predetermined number of players, determine the players' cards to be dealt to the players having accepted entry for participation in excess of the number of players, based upon card data excluding the banker's cards dealt based upon the first card set data among the second card set data stored in the memory; (e) execute processing of displaying the players' cards determined in (d) on the display devices corresponding to the players having accepted entry for participation in excess of the number of players among the plurality of display devices; (f) execute processing of determining a winner or loser after comparing hands of the players' cards dealt to the player and a hand of the banker's cards; (g) display the players' cards on the common display device on a player-by-player basis; (h) determine a payment, based upon a combination of cards included in the players' cards of the players having accepted the side BET among the players' cards displayed on the common display device; and (i) give a payment to the players having accepted the side BET in accordance with the determined payment.

According to the sixth aspect of the present invention, for example, in a case where a predetermined limited number of players have already participated in given games, other players could not participate until a vacancy takes place. In addition, the number of participants could not be increased. According to the sixth aspect of the present invention, a dealer can use a plurality of card sets, thus allowing other players to participate in the games partway without waiting for such a vacancy. Further, the number of participants can be increased, thus allowing a large number of persons to perform games and create a thriving atmosphere. The game machine of playing card games, having these new entertainabilities, can be provided. Further, according to the sixth aspect of the present invention, for example, in comparison with hands of the players who have participated in games, in a case where a payment is given to a player having a hand of the strongest combination among the compared hands, the players are allowed to perform games while they have an interest in competing against each other and its related payment in addition to an interest in competing against the dealer and its related payment. The game machine of playing card games, having these new entertainabilities, can be provided. Furthermore, according to the sixth aspect of the present invention, in addition to a base game and its related payment, the players participate simultaneously in other games in which the larger number of participants is and the more side BET is accumulated, so that the higher payment can be obtained. Therefore, the players are allowed to enhance excitement for a higher payment, and the game machine of playing card games, having new entertainability, can be provided.

A seventh aspect of the present invention is a method of playing card games, comprising the steps of: (a) accepting participation of players; (b) determining banker's cards and players' cards, the players' cards being dealt to the players having accepted entry for participation from the input device, from the first card set data stored in the memory; (c) among the plurality of display devices, executing processing of displaying the players' cards determined at the step (b) on the display devices corresponding to the players having accepted entry for participation; (d) in a case where the number of players having accepted entry for participation stored in the memory exceeds a predetermined number of players, determining the players' cards to be dealt to the players having accepted entry for participation in excess of the number of players, based upon card data excluding the banker's cards dealt based upon the first card set among a second card that consists of cards identical to those of the first card set; (e) dealing the players' cards determined at the step (d) to the players having accepted participation in excess of the number of players among the plurality of display devices; and (f) determining a winner or loser after comparing hands of the players' cards dealt to the players and a hand of the banker's cards.

According to the seventh aspect of the present invention, for example, in a case where a predetermined limited number of players have already participated in given games, other players could not participate until a vacancy takes place. In addition, the number of participants could not be increased. According to the seventh aspect of the present invention, a dealer can use a plurality of card sets, thus allowing other players to participate the games partway without waiting for such a vacancy. Further, the number of participants can be increased, thus allowing a large number of persons to perform games and create a thriving atmosphere. Therefore, the game machine of playing card games, having these new entertainabilities, can be provided.

An eighth aspect of the present invention is the method of playing card games, including the steps of: (g) placing and arranging the players' cards so as to be viewed from the players; (h) determining a payment based upon a combination of cards included in the players' cards placed at step (g); and (i) giving a payment to the players in accordance with the determined payment.

According to the eighth aspect of the present invention, for example, in a case where, in comparison with hands of the players who have participated in games, a payment is given to a player having a hand of the strongest combination among the compared hands, the players are allowed to perform games while they have an interest in competing against each other and its related payment in addition to an interest in competing against the dealer and its related payment. As the result, it is possible for the players to enhance excitement, and the game machine of playing card games, having new entertainability, can be provided.

A ninth aspect of the present invention is the card game playing method, further including the step of (j) accepting a side BET different from a normal BET, the step (h) including the step of determining a payment based upon a combination of the players' cards of the players having accepted the side BET, among the players' cards, the step (i) including the step of giving a payment to the players having accepted the side BET.

According to the ninth aspect of the present invention, for example, in addition to a base game and its related payment, the players participate simultaneously in other games in which the larger number of participants is and the more side BET is accumulated, so that the higher payment can be obtained. Therefore, the players are allowed to enhance excitement for a higher payment, and the game machine of playing card games, having new entertainability, can be provided.

A tenth aspect of the present invention is a method of playing card games, including the steps of: (a) accepting participation of players; (b) determining banker's cards and players' cards, the players' cards being dealt to the players having accepted entry for participation from the input device, based upon the first card set data stored in the memory; (c) among the plurality of display devices, executing processing of displaying the players' cards determined at the step (b) on the display devices corresponding to the players having accepted entry for participation; (d) in a case where the number of players having accepted entry for participation stored in the memory exceeds a predetermined number of players, determining the players' cards to be dealt to the players having accepted entry for participation in excess of the number of players, based upon card data excluding the banker's cards dealt based upon the first card set data among a second card set that consists of cards identical to those of the first card set; (e) dealing the players' cards determined at the step (d) to the players having accepted entry for participation in excess of the number of players among the plurality of display devices; (f) determining a winner or loser after comparing hands of the players' cards dealt to the players and a hand of the banker's cards; (g) placing and arranging the players' cards so as to be viewed from the players; (h) determining a payment based upon a combination of cards included in the players' cards placed at step (g); and (i) giving a payment to the players in accordance with the determined payment.

According to the tenth aspect of the present invention, for example, in a case where a predetermined limited number of players have already participated in given games, other players could not participate until a vacancy takes place. In addition, the number of participants could not be increased. According to the tenth aspect of the present invention, a dealer can use a plurality of card sets, thus allowing other players to participate in the games partway without waiting for such a vacancy. Further, the number of participants can be increased, thus allowing a large number of persons to perform games and create a thriving atmosphere. The game machine of playing card games, having these new entertainabilities, can be provided.

According to the tenth aspect of the present invention, for example, in a case where, in comparison with hands of the players who participated in games, a payment is given to a player having a hand of the strongest combination among the compared hands, the players are allowed to perform games while they have an interest in competing against each other and its related payment in addition to an interest in competing against the dealer and its related payment. As the result, it is possible for the players to enhance excitement, and the game machine of playing card games, having new entertainability, can be provided.

An eleventh aspect of the present invention is the card game playing method, further including the step (j) of accepting a side BET different from a normal BET, the step (h) including the step of determining a payment based upon a combination of the players' cards of players having accepted the side BET, among the players' cards, the step (i) including the step of giving a payment to the players having accepted the side BET.

According to the eleventh aspect of the present invention, for example, in addition to a base game and its related payment, the players participate simultaneously in other games in which the larger number of participants is and the more side BET is accumulated, so that the higher payment can be obtained. Therefore, the players are allowed to enhance excitement for a higher payment, and the game machine of playing card games, having new entertainability, can be provided.

DESCRIPTION OF THE PREFERRED EMBODIMENTS

Figure 1:
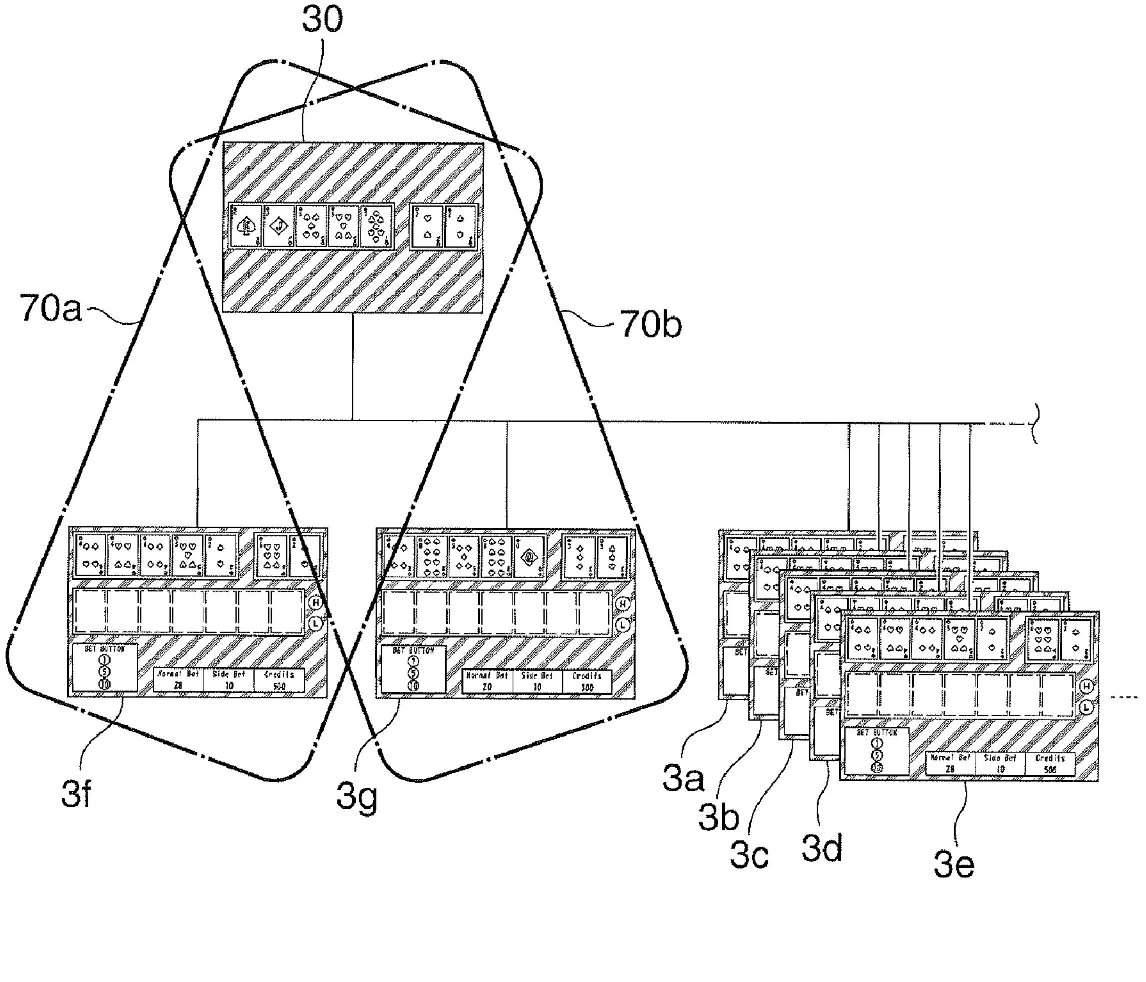
FIG. 1 is a correlative view showing a relationship between card sets to be used by a game machine according to the present embodiment.

Hereinafter, a game machine 1 according to the present embodiment will be described in detail with referring to the drawings. In the embodiments that follow, when a PAIGOW poker is performed, in a case where entry has been made such that seven or more persons (exceeding a predetermined number of players) participate in the poker, cards are dealt to the players while a second card set is used. A game performed apart from a regular PAIGOW poker is defined as a side game.

First, the rules of the PAIGOW poker will be described in detail. In the PAIGOW poker of the present embodiment, one or more players complete against a banker with the use of one set of 52 trump cards (playing cards) excluding a joker.

Seven cards are dealt to each of the persons consisting of a banker and the players. Each of them divides seven cards into two groups of five cards and of two cards. At this time, a hand of five cards (a high hand) must be as strong as or must be stronger than that of two cards (a low hand).

Next, it is judged as to which one of the players' hands is strong or weak after comparing the five cards of each of the banker's and players' hands with each other. Similarly, it is judged as to which one of the players' hands is strong or weak after comparing the two cards of each of the banker's and players' hands with each other. In a case where the banker's hands are stronger in both of the two groups of five and two cards, it is judged to be the banker's win. In a case where one of the players' hands is stronger in both of the two groups of five and two cards, it is judged to be the player's win. In a case where the player's hands are stronger in one of the two groups consisting of five cards and two cards, and the banker's hand is stronger in the other one, it is judged to be "draw". In addition, in a case where the player's hand and the banker's hand are identical to each other in strength with respect to both of the two groups of five and two cards, it is judged to be the banker's win.

The hands of five cards include "Royal Flush", "Straight Flush", "Four of a Kind", "Full House", "Straight", "Three of a Kind", "Two of a Kind", and "No Pair" in order of strength. The hands of two cards include "One Pair" and "No Pair" in strength.

In addition, in a case where the player's and banker's hands are identical to each other, it is judged as to which one of the players' hands is strong or weak after comparing the numbers or alphabets drawn in cards constituting the hands with each other. The card's numbers and alphabets include "A", "K", "Q", "J", "10", "9", "8", "7", "6", "5", "4", "3", and "2" in sequential order from the strongest combination of the five cards.

In the embodiments that follow, a PAIGOW poker accepting a normal BET and a side BET is executed. The normal BET is to be performed for the play of the PAIGOW poker, and the side BET is stored in an accumulative manner as a jackpot (hereinafter, referred to as a JP) at a predetermined rate included in a betted currency value (50% in the embodiments of the present invention). The following embodiments describe a case in which a dealer takes over a banker.

Referring now to FIG. 1, the essential parts of the present invention will be described in detail. In the figure, a banker and a plurality of players perform a method of playing card games. Further, a case in which a predetermined number of players is six and seven players participate in the games will also be described.

FIG. 1 is a correlative view showing a relationship between card sets to be used by a game machine according to the present embodiment. As shown in FIG. 1, first, a banker 30 starts a game after accepting participation of players. The banker deals seven cards (a predetermined number of cards) as players' cards 72 out of a first card set 70*a* (one set of cards) made up of a plural types of cards used for this game, to each of players 3*a* to 3*f* having accepted participation, and deals seven cards to the banker as the banker's cards. Namely, the players 3*a* to 3*f* deal the cards of the first card set 70*a*.

Next, a seventh player 3*g* participates in the game, so that the banker deals to the seventh player whose participation was accepted, as the player's cards, seven cards from among those excluding the banker's cards dealt based upon the first card set, out of a second card set 70*b* made up of cards identical to the first card set. A player 3*g* deals the cards of the second card set 70*b*.

Next, the player divides the dealt player's cards 72 into two groups of cards. Similarly, the banker divides the dealt banker's cards into two groups of cards. Then, the high hand of the seven player's cards and that of the banker's cards are compared with each other, respectively, while the low hand of the player's cards and that of the banker's cards are compared with each other, and a winner or loser is determined, respectively.

In this manner, a game can be performed while the banker's cards are used in common, and seven players can participate in the game, although it has been generally impossible to do so. Namely, an unlimited number of players can participate therein. In addition, the player's cards are placed and arranged so that they are faced up from the players, and then, a payment is determined based upon combinations of the cards included in the player's cards, so that a payment may be given to the players in response to a determined payment.

In addition, on condition that a side BET different from a normal BET has been accepted, a payment is determined, based upon combinations of the player's cards of the player having accepted the side BET from among the player's cards so that the payment may be given to the players.

Figure 2:
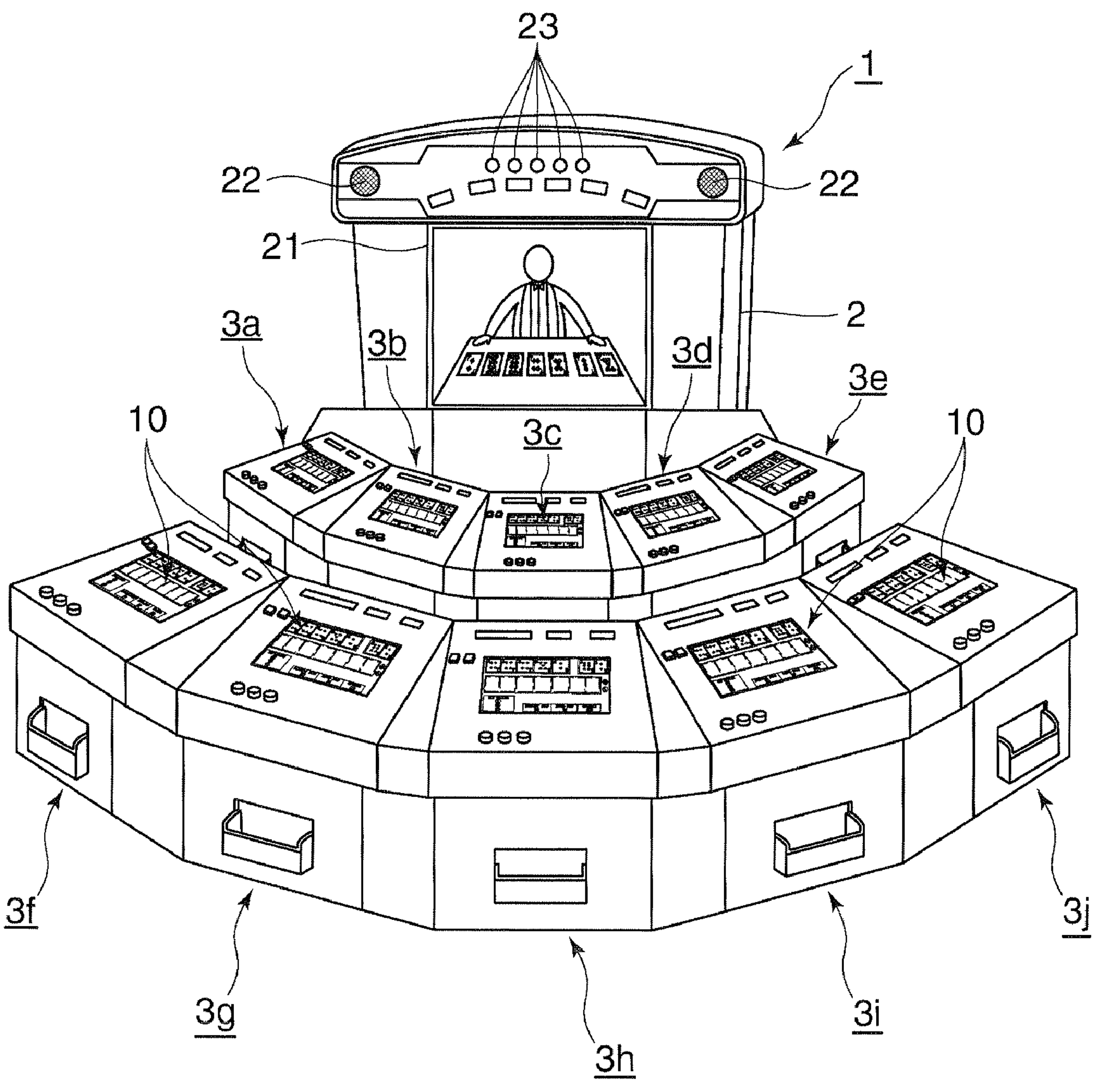
FIG. 2 is a perspective view schematically depicting a game machine according to a first embodiment.

FIG. 2 is a perspective view schematically depicting an appearance and a configuration of a game machine according to a first embodiment of the present invention. As shown in FIG. 2, the game machine 1 is basically made up of a main monitor 2 and ten stations 3 (stations 3*a* to 3*j*). While the present embodiment describes in detail a case in which the game machine 1 is provided with a plurality of stations 3 (ten stations), the game machine may include over ten stations in the present invention or may be less than ten stations.

A front panel display 21 is provided at the center part of a main monitor 2, and an image indicative of a dealer and cards is displayed. The front panel display 21 is equivalent to a display device of the present invention. In addition, provided at the upper side of the main monitor 2 are: a speaker 22 for outputting music or effect sounds in accordance with the progress of a game executed by the game machine 1; and an LED23 that is lit at the time of various effects. The front panel display 21 is equivalent to a common display used in common by a plurality of players, of the present embodiment.

Figure 3:
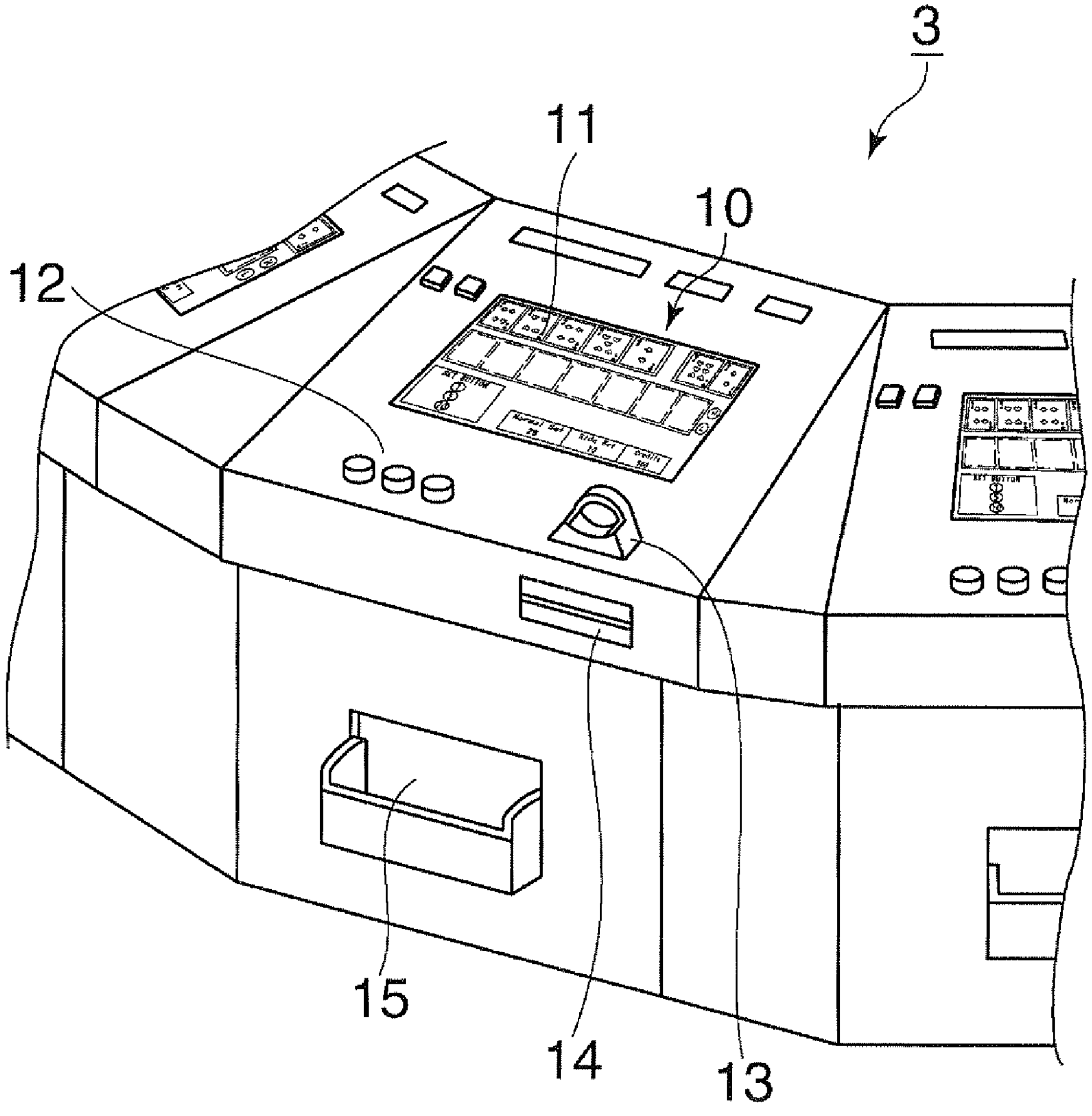
FIG. 3 is a perspective view schematically depicting an appearance and configuration of stations included in the game machine shown in FIG. 2.

FIG. 3 is a perspective view schematically depicting an appearance and a configuration of stations included in the game machine shown in FIG. 2. As shown in FIG. 3, a liquid crystal display 10, which displays an image or the like relating to operation (see FIG. 5), as described later, is provided at the upper center of a station 3. In the present embodiment, the station 3 is equivalent to a plurality of input devices which are provided corresponding to each of a plurality of players and which accept entry for participation of the players. In addition, a plurality of liquid crystal displays 10 are equivalent to a plurality of display devices provided corresponding to a respective one of a plurality of players in the present invention.

In addition, a touch panel 11 for inputting operations such as BET is provided on the upper face of the liquid crystal display 10. The touch panel 11 is equivalent to a normal BET switch, a side BET switch, and an input switch, of the present invention.

An operational button 12 for making payout operation and a coin insertion slot 13 for inserting coins or medals are provided in front of the liquid crystal display 10. A bill insertion slot 14 for inserting bills is provided at the front top right end of the station 3. Provided downwardly of the bill insertion slot 14 is a coin payout opening 15 through which the coins or medals corresponding to stored credit are paid out to the players when payout operation is made.

Figure 4:
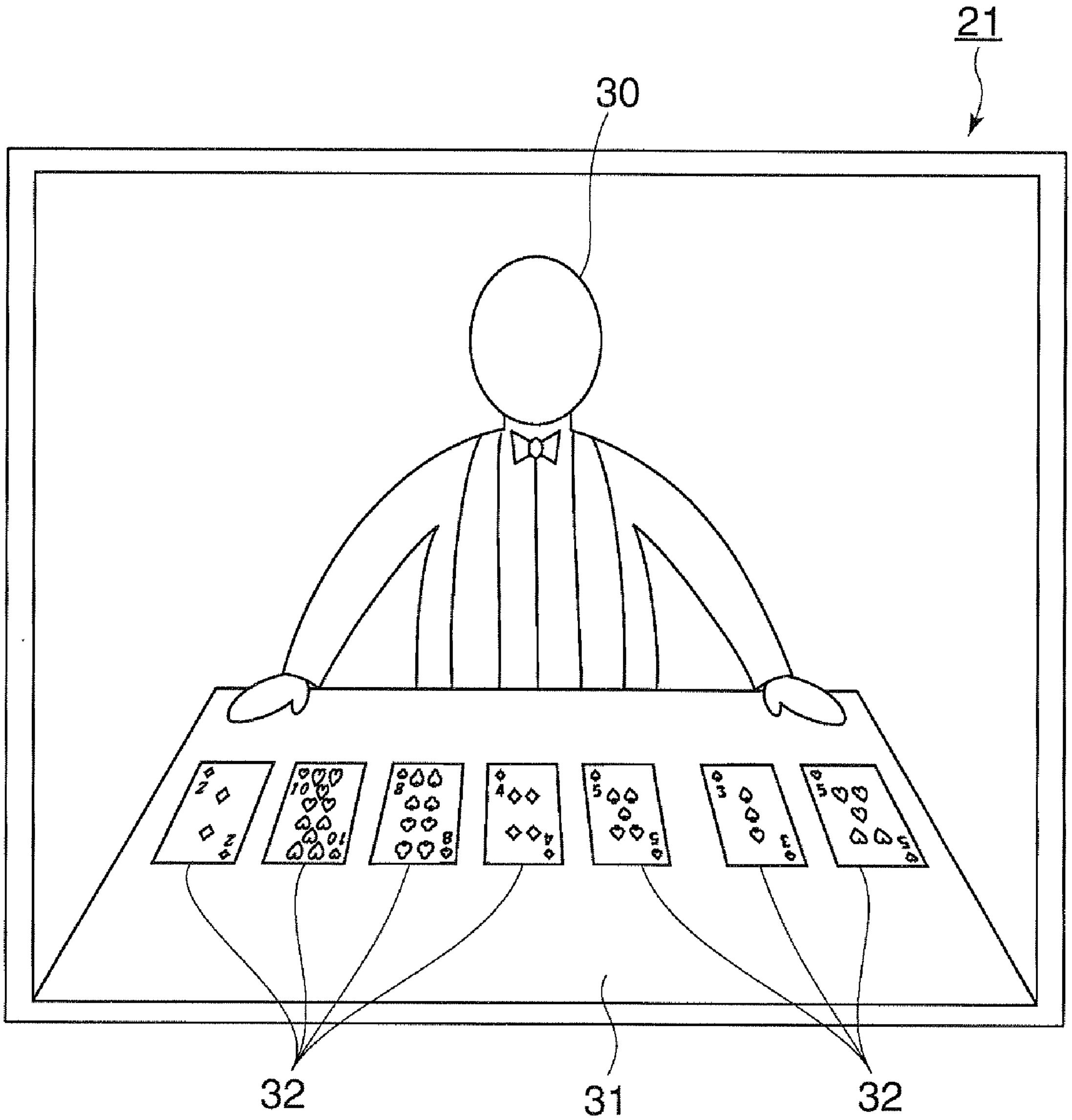
FIG. 4 is a view showing an exemplary image displayed on a front display included in the game machine according to the first embodiment.

FIG. 4 is a view showing an exemplary image displayed on a front panel display included in a game machine. As shown in FIG. 4, the front panel display 21 displays a dealer image 30 indicative of a dealer (banker), a table image 31 indicative of a table, and a card image 32 indicative of seven banker's cards. The card image 32 is displayed in a faced down manner when cards are dealt to the dealer. When a high hand and a low hand are determined, the card image 32 is displayed in a faced up manner. In FIG. 4, the left five cards toward the dealer indicate a high hand, and the right two cards indicate a low hand.

Figure 5:
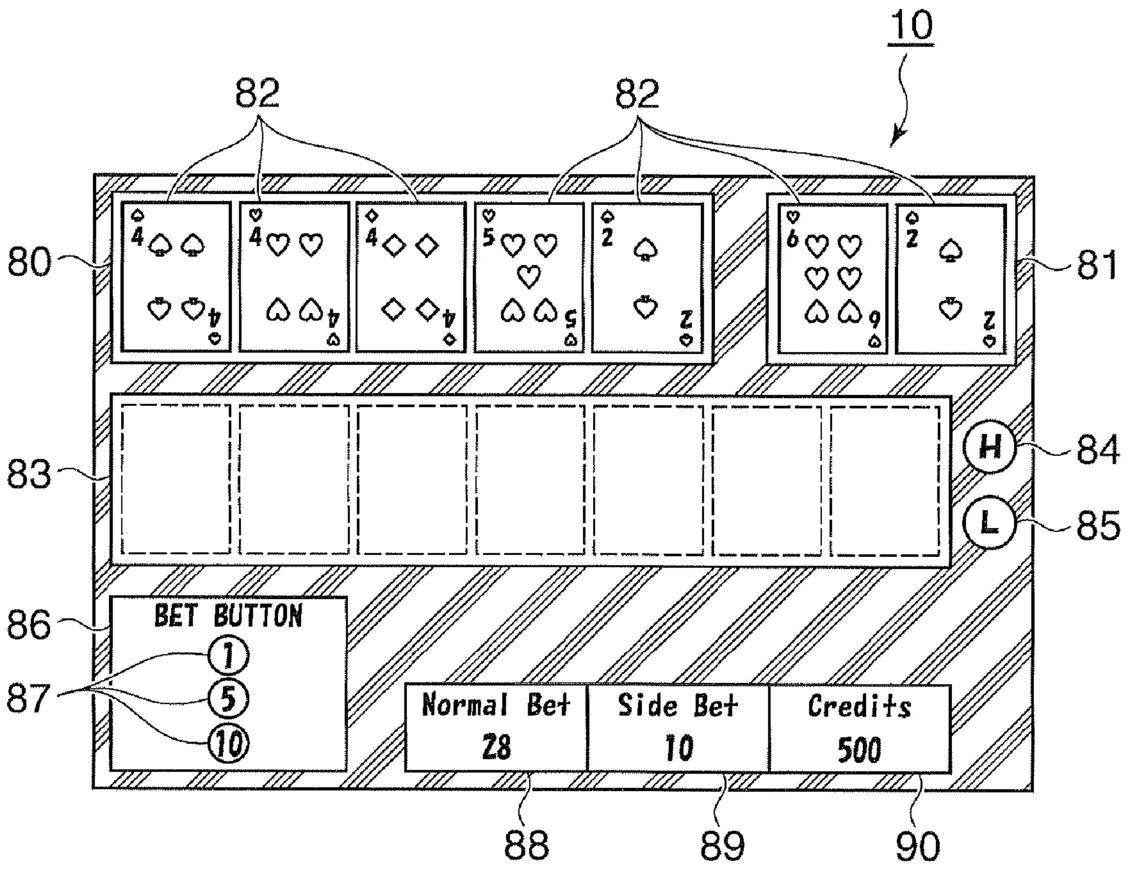
FIG. 5 is a view showing an exemplary image displayed on a liquid crystal display included in each of the stations according to the first embodiment.

FIG. 5 is a view showing an exemplary image displayed on a liquid crystal display included in each of stations. As shown in FIG. 5, a high hand display section 80, which displays a player's high hand, and a low hand display section 81, which displays a low hand, are provided at the upper side of the liquid crystal display 10. The high hand display section 80 and the low hand display section 81 display card images 82 indicative of a high hand card and a low hand card, respectively, in a faced up manner.

A dealt-card display section 83 is provided at the lower side of the high hand display section 80. A card image indicative of the seven player's cards dealt to each of the players is displayed in a faced up manner at seven portions enclosed by the dotted line of the dealt-card display section 83. A high hand determination button 84 and a low hand determination button 85, for determining cards constituting a high hand and a low hand, are provided at the right side of the dealt-card display section 83. A player can determine a high hand by selecting a card desired to be high hand, via a touch panel 11, from among the cards displayed at the dealt-card display section 83, and then, operating the high hand determination button 84. The card determined to be a high hand is displayed at the high hand display section 80. Similarly, the player determines a low hand by selecting a card desired to be a low hand, via the touch panel 11, from among the cards displayed at the dealt-card display section 83, followed by operating a low hand determination button 85 via the touch panel 11.

A BET button display section 86 is provided at the lower side of the dealt-card display section 83. The BET button display section 86 displays a BET button 87 for inputting a BET number. The player can input a normal BET number and a side BET number by operating a BET button 87 via the touch panel 11.

A normal BET number display section 88, which displays the number of normally betted coins, is provided at the right side of the BET button display section 86. It is shown here that 28 coins have been betted. In a case where betting of these 28 coins is input, the player may operate "10" of the BET button 87 twice, "5" of the BET button 87 once, and "1" of the BET button 87 three times.

A side BET number display section 89, which displays the number of side-betted coins, is provided at the right side of a normal BET number display section 88. It is shown here that 10 coins have been betted. A credit number display section 90 is provided at the right side of the side BET number display section 89. In the figure, it is shown here that 500 coins have been credited.

Figure 6:
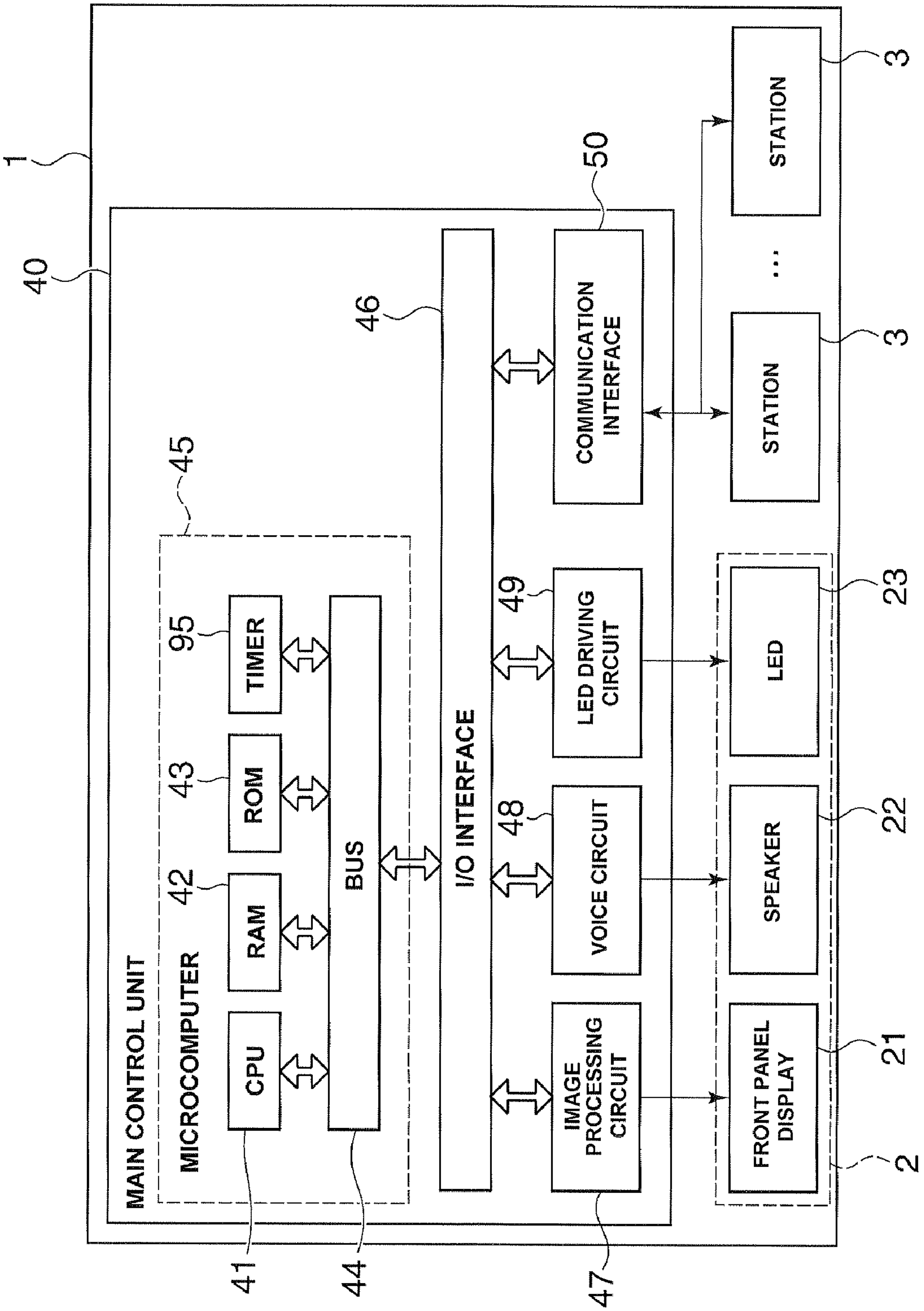
FIG. 6 is a block diagram depicting an internal configuration of the game machine shown in FIG. 2.

FIG. 6 is a block diagram depicting an internal configuration of a game machine shown in FIG. 2. As shown in FIG. 6, a main control unit 40 included in the game machine 1 is basically constituted while microcomputers 45 made up of a CPU41 (controller), a RAM42 (memory), a ROM43 (memory), a timer 95, and a bus 44 for transferring data therebetween are employed as a base. The CPU41 of the main control unit 40 is equivalent to a controller in the present invention. The CPU41 controls equipment such as the front panel display 21, the stations 3, the RAM42, and the ROM43, which were connected in order to conduct a game, and then, conducts games. The CPU41 is connected, via an I/O interface 46, to an image processing circuit 47, a voice circuit 48, an LED driving circuit 49, and a communication interface 50.

The ROM43 stores a variety of programs or data tables and the like, for performing processing required for controlling the game machine 1.

The RAM42 is a memory for temporarily storing a variety of data computed by the CPU41. The variety of data includes: the first card set data inclusive of the plural types of card data; the second card set data inclusive of card data identical to that of a card included in the first card set data; the number of players having accepted entry for participation by the input device; and a payment data table, which is based upon combinations of cards. In addition, a timer 95 performs time measurement.

A front panel display 21 constituting a main monitor 2 is connected to the image processing circuit 47; a speaker 22 constituting the main monitor 2 is connected to the voice circuit 48; and the LED23 constituting the main monitor 2 is connected to the LED driving circuit 49. Ten stations 3 are connected to the communication interface 50.

The CPU41 conducts games (a PAIGOW poker and a side game) in the game machine 1, based upon: game programs (including a PAIGOW poker game program and a side-game program) stored in the ROM43; and various signals to be received from stations 3. In addition, the CPU41 displays images on the front panel display 21, based upon the above game program, outputs a sound from the speaker 22, and then, illuminates the LED23. In addition, the CPU41 transmits various signals to each of stations 3, based upon the above-mentioned game programs.

Figure 7:
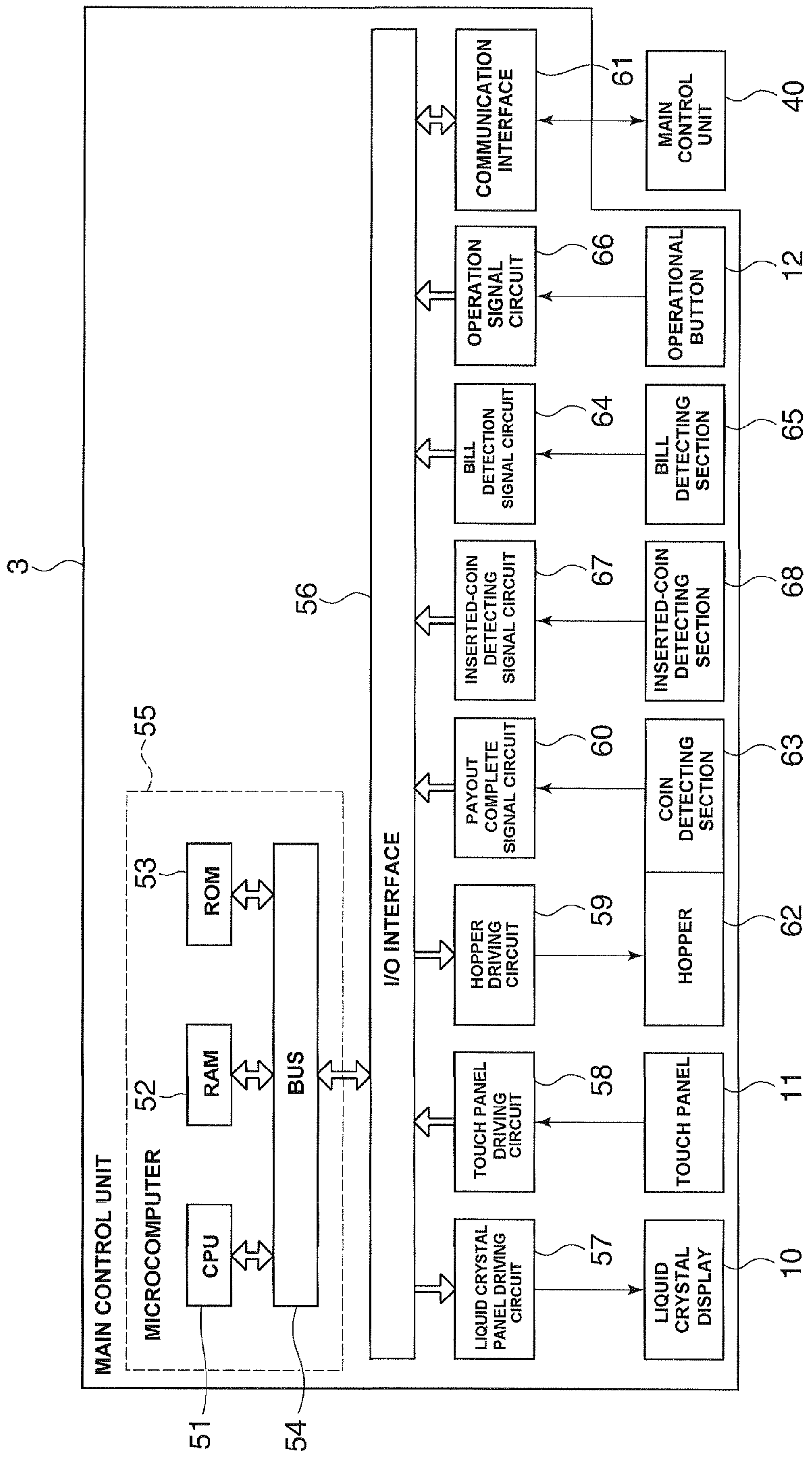
FIG. 7 is a block diagram depicting an internal configuration of the station included in the game machine shown in FIG. 2.

FIG. 7 is a block diagram depicting an internal configuration of stations included in the game machine shown in FIG. 2. As shown in FIG. 7, stations 3 are basically constituted while microcomputers 55 made up of a CPU51, a RAM52, a ROM53, and a bus 54 for transferring data therebetween are employed as a base.

The ROM53 stores a variety of programs and data tables or the like, for performing processing required for controlling stations 3. In addition, the RAM52 temporarily stores the credit number currently stored in stations 3 and a variety of data computed by the CPU51.

In addition, the CPU51 is connected, via an I/O interface 56, to a liquid crystal panel driving circuit 57; a touch panel driving circuit 58; a hopper driving circuit 59; a payout complete signal circuit 60; an inserted-coin detection signal circuit 67; a bill detection signal circuit 64; an operation signal circuit 66; and a communication interface 61.

The liquid crystal display 10 is connected to the liquid crystal panel driving circuit 57; the touch panel 11 is connected to the touch panel driving circuit 58; a hopper 62 is connected to a hopper driving circuit 59; a coin detecting section 63 is connected to the payout complete signal circuit 60; an inserted-coin detecting section 68 is connected to the inserted-coin detection signal circuit 67; a bill detecting section 65 is connected to the bill detection signal circuit 64; and the operational button 12 is connected to the operation signal circuit 66, respectively.

The hopper 62 serves to pay out coins from the coin payout opening 15, based upon a control signal output from the CPU51. The coin detecting section 63 is provided inside the coin payout opening 15, and transmits signals to the CPU51 in a case where it is detected that a predetermined number of coins have been paid out from the coin payout opening 15.

Upon detecting that coins have been inserted through the coin insertion slot 13, the inserted-coin detecting section 68 detects the amount of the detected coins, and then, transmits to the CPU51 a detection signal indicative of the detected amount. The detected coins are stored in the RAM52 while a predetermined amount is handled as one credit.

At the time of acceptance of bills, the bill detecting section 65 detects the amount of the accepted bills, and then, transmits to the CPU51 a detection signal indicating the detected amount. The detected bills are stored in the RAM52 while the predetermined amount is handled as one credit. The operation button 12 is intended for performing payout operation in a case where coin payout has been determined.

Figure 8A:
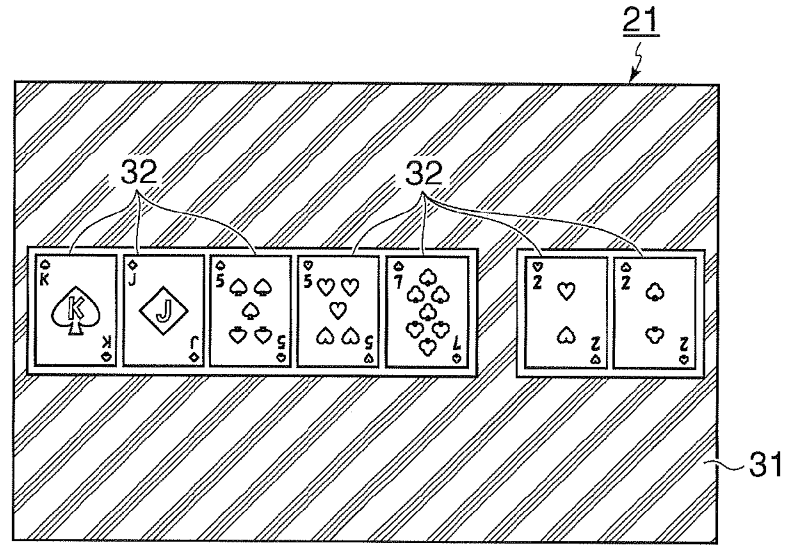
FIG. 8A is a view showing an exemplary image displayed on the front display of the game machine according to the first embodiment.
Figure 8B:
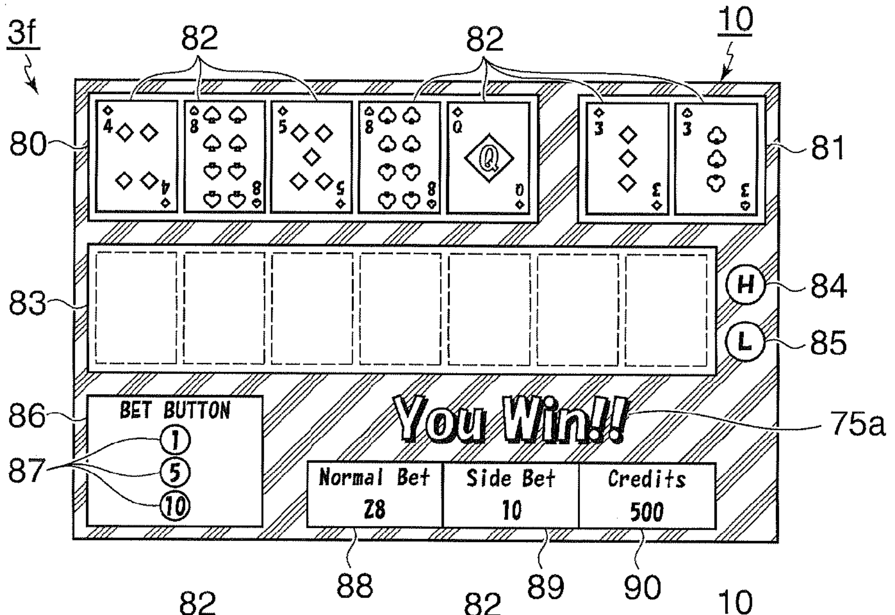
FIG. 8B is a view showing an exemplary image displayed on a liquid crystal display of each of the stations according to the first embodiment.
Figure 8C:
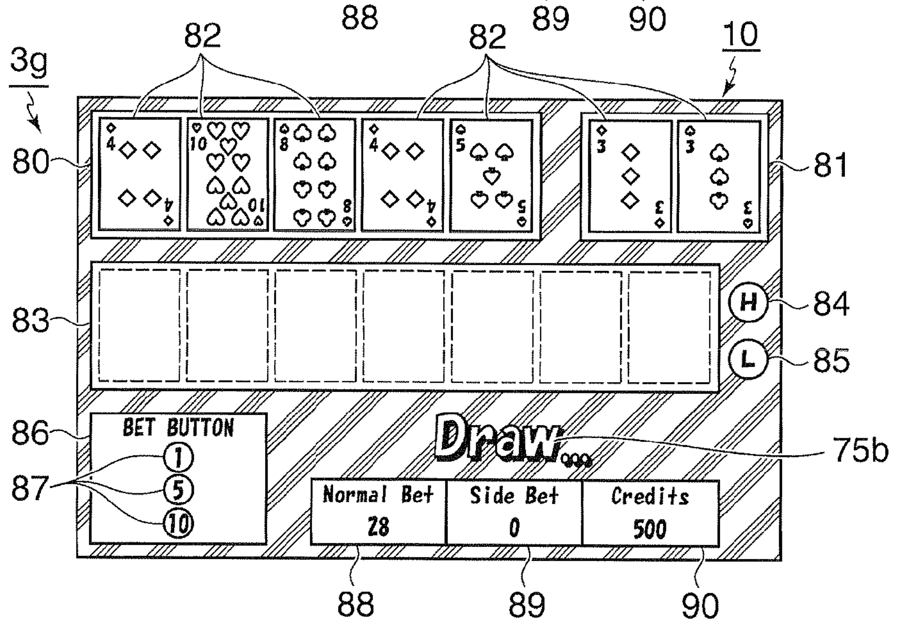
FIG. 8C is a view showing an exemplary image displayed on the liquid crystal display of each of the stations according to the first embodiment.

FIGS. 8A, 8B, and 8C are views each showing an exemplary image displayed on a front panel display of the game machine according to the first embodiment and on a liquid crystal display of a station. As shown in FIG. 2A, the game machine 1 is made up of the main monitor 2 and 10 stations 3 (3*a* to 3*j*). The figures each show an example in which a side BET is performed.

As shown in FIG. 8A, a display section 31 is provided which, when a basic game is started, displays banker's cards on a display device 21 at the center of a main monitor 2. This display section 31 displays banker's cards 32 dealt to a banker. The banker divides the dealt banker's cards 32 into a group of five cards and a group of two cards. Five cards of a high hand include "K of spade"; "J of diamond", "5 of spade", "5 of heart", and "7 of club" and two cards of a low hand include "2 of heart" and "2 of club".

FIG. 8B shows an example in which a player performs a side BET. Provided at a liquid crystal display 10 of a station 3 are: the high hand display section 80, which displays a high hand; and the low hand display section 81, which displays a low hand. The player's card display section 83, which displays the player's cards after dealt, is provided at the lower side of the display. Cards dealt to a station at which the player operates (station 3*a*) are displayed at the player's card display section 83. After that, the player operates the high hand determination button 84 via the touch panel 11, thereby making it possible to determine a high hand, and then, operates the low hand determination button 85 via the touch panel 11, thereby making it possible to determine a low hand. Five cards of a high hand are displayed at the high hand display section 80 and two cards of the low hand are displayed at the low hand display section 81, respectively.

The five cards of the player's high hand are "4 of diamond", "8 of spade", "5 of diamond", "8 of club", and "Q of diamond", and two cards of low hand are "3 of diamond" and "3 of club". Here, the player performs a side BET. The side-BET display section 89 displays that ten coins are side-betted.

Then, the winner or loser of a high hand is determined after comparing the player's five-card high hand with that of the banker. The banker's high hand is "one pair" of cards "5," whereas the player's high hand is one pair of cards "8". This means the player's win at high hand. Similarly, the winner or loser of a low hand is determined after comparing the two-card low hand of the player with that of the banker. The banker's low hand is "one pair" of cards "2," whereas the player's low hand is "one pair" of cards "3". This means the player's win at low hand. Finally, the player has won at both of the high and low hands, and thus, it means the player's win in the game.

The player's game outcome is displayed as a winner-loser information display 75*a* at the lower side of the dealt-card display section 83. (A message "You Win" is displayed because the player has won.) In addition, a BET button display section 86 is provided at the lower side of the dealt-card display section 83. Further, the normal BET number display section 88; the side BET number display section 89, which displays the number of side-betted coins; and the credit number display section 90, are provided at the lower side of a dealt-card display section 75*a*. In this case, 28 coins are normally betted, ten coins are side-betted, and 500 coins are credited.

As shown in FIG. 8C, further, at a station (station 3*g*) operated by over a predetermined number of players having accepted participation as well, the banker's cards are commonly used, and a game is conducted as is the case with FIG. 8B. From the dealt card 72, a player operates a high hand determination button 84 via the touch panel 11, thereby making it possible to determine a high hand. Then, the player operates the low hand determination button 85 via the touch panel 11, thereby making it possible to determine a low hand. The five cards at the high hand are displayed at the high hand display section 80, and the two cards at the low hand are displayed at the low hand display section 81, respectively. The high hand display section 80 is provided which displays a high hand at the upper left of the screen of the liquid crystal display 10 of the station 3, and the low hand display section 81 is provided which displays a low hand at the right side thereof.

The five cards of the player's high hand are "4 of diamond", "10 of heart", "8 of club", "4 of diamond", and "5 of spade", and two cards of the low hand are "3 of diamond" and "3 of club". The following description assumes that the player does not perform a side BET; the side BET display section 89 is "0", and no side bet is made.

Thereafter, the winner or loser of high hands is determined after comparing high hands of the five cards of each of the banker and player. The banker's high hand is "one pair" of cards "5", whereas the player's high hand is one pair of cards "4". This means the banker's win at high hand. Similarly, the winner or loser of the low hand is determined after comparing the low hands of two cards of each of the banker and player. The banker's low hand is "one pair" of cards "2", whereas the player's low hand is "one pair" of cards "3". This means that the player's win at low hand. The banker wins at high hand and the player wins at low hand. Therefore, the outcome of the game is "draw". The player's game outcome is displayed as the winner-loser information display 75*a* at the lower side of the dealt-card display section 83. (A message "Draw" is displayed because the outcome of the game outcome is draw).

Figure 9:
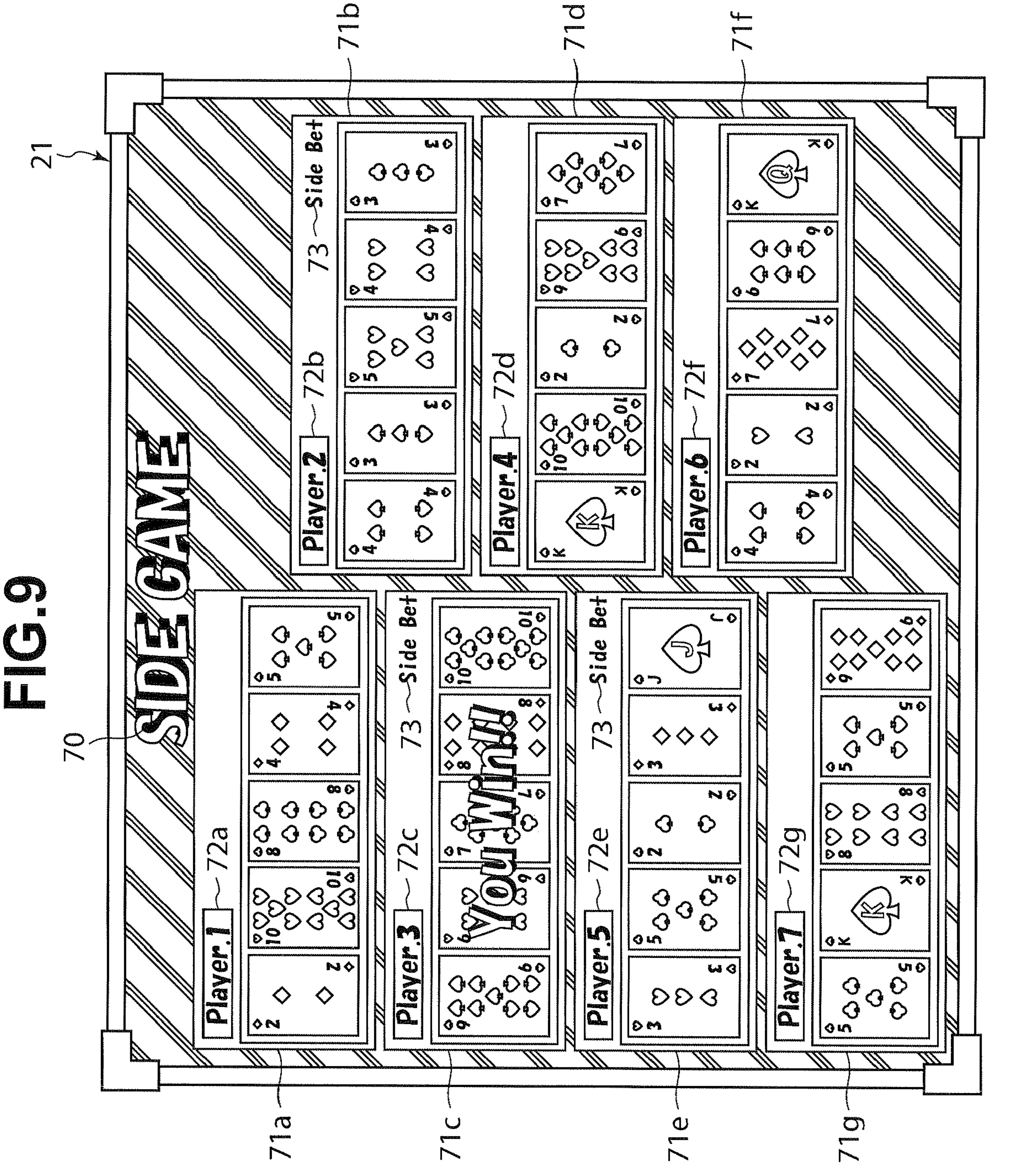
FIG. 9 is a view showing an exemplary image displayed on a liquid crystal display included in each of the stations while in a side game according to the first embodiment.

Next, a side game will be described in detail with referring to the drawings. FIG. 9 is a view showing an exemplary image of a side game displayed on a front panel display of a game machine according to the first embodiment. Further, a case in which seven players participate in the side game will also be described, assuming that the players operate stations 3*a* to 3*g*, respectively.

As shown in FIG. 9, when a side game is started, a side game display 70 is displayed on the front panel display 21. On condition that a player performs a side BET, five card images 71*a* to 71*g* at the high hands are displayed on the front panel display 21 from among the cards dealt to the players having performed the side BET, from among the players of all of the stations 3*a* to 3*e*. The card images 71*a* to 71*g* of the corresponding players' hands are displayed at the lower sides of the player number displays 72*a* to 72*g*. In addition, at the right side of each of the player number displays 72*a* to 72*g*, a side BET number 73 is provided in a case where a side BET is performed. In this case, combinations of cards of the players at the stations 3*a* to 3*g* are judged, and then, the winner-loser information display 73 is displayed for a player who realized a predetermined combination. Here, since a combination "straight" is the strongest among players (player 2, player 3, and player 5) who have performed side BET of all of the stations 3*a* to 3*g*, the winner-loser information display 79 (a message "You Win" appears) is displayed on that card 71*c*, and the players receive a predetermined payout.

Figure 10A:
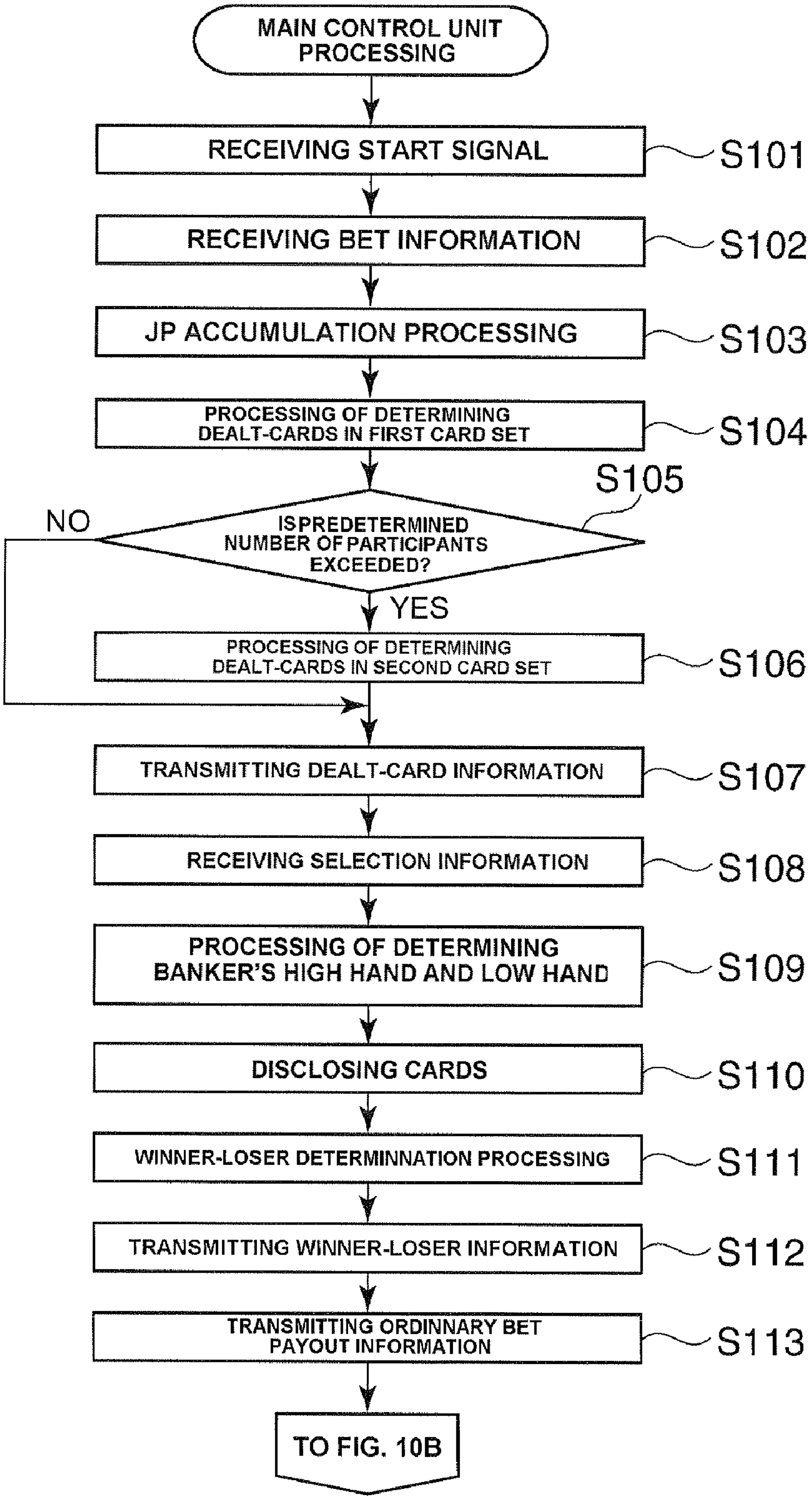
FIG. 10A is a flowchart showing a main control unit processing executed at a main control unit included in the game machine according to the first embodiment.
Figure 10B:
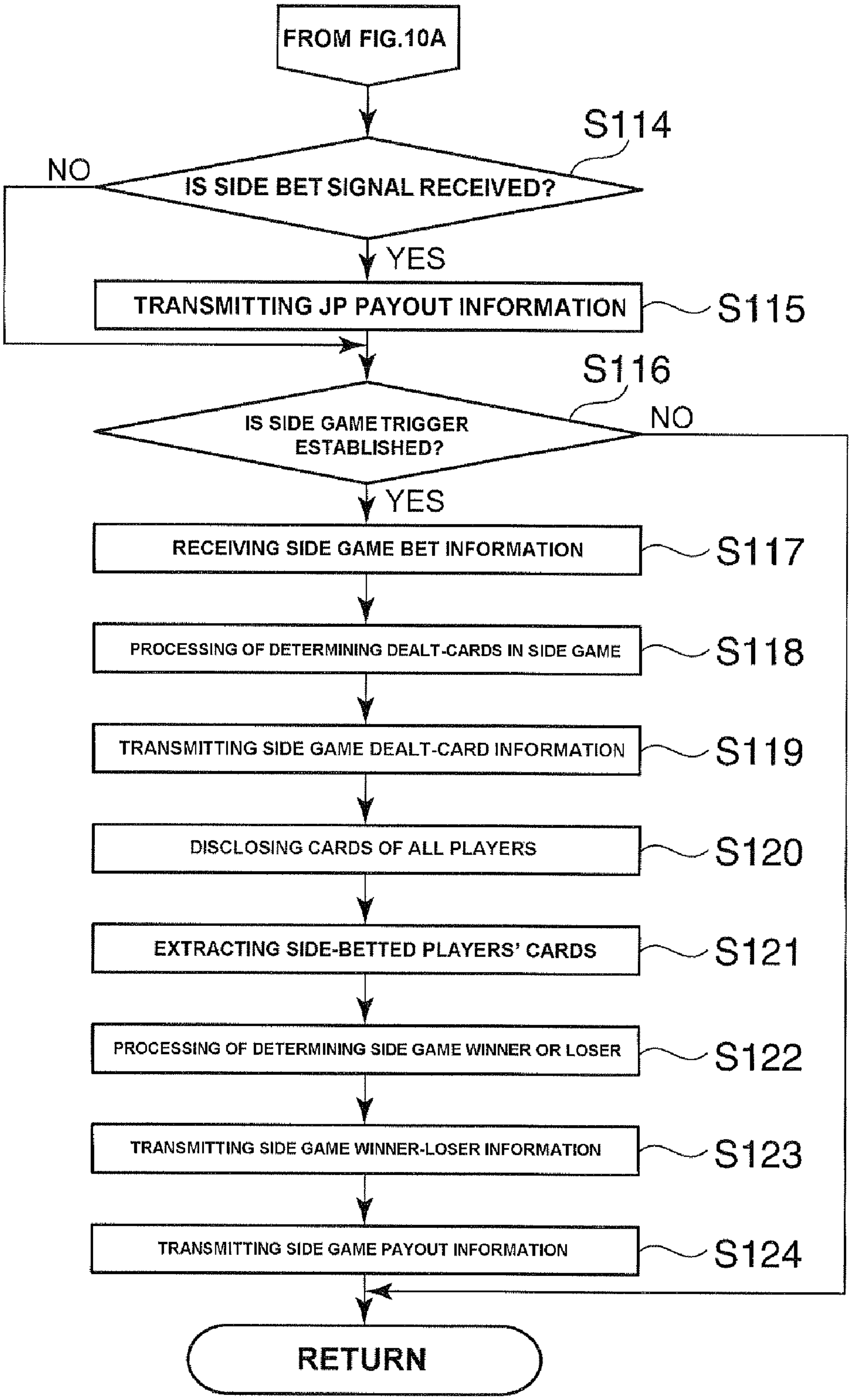
FIG. 10B is a flowchart showing a main control unit processing executed at a main control unit included in the game machine according to the first embodiment.

Next, a processing operation performed at the main control unit 40 and a station 3 will be described in detail. FIGS. 10A and 10B are flowcharts each showing main control unit processing executed at a main control unit included in the game machine according to the first embodiment.

As shown in FIG. 10A, in the main control unit processing, at first, start signal reception processing is performed (step S101). In this processing operation, a CPU41 included in the main control unit 40 receives a start signal from a station 3. Specifically, the CPU41 receives a start signal from any one of the stations 3. Namely, the CPU41 accepts the player's participation. The start signal is obtained when it is triggered for conducting a PAIGOW poker game in the game machine 1.

Next, the CPU41 receives BET information from a station 3 (see FIG. 2) (step S102). The BET information is relevant to BET, and includes: information indicative of whether or not a normal BET and a side BET have been performed; and information indicative of the amounts of the normal BET and the side BET. Namely, this CPU executes processing of accepting the normal BET and the side BET that is different therefrom.

Next, the CPU41 executes JP accumulation processing (step S103). Specifically, the CPU41 accumulatively stores, in the RAM42 (see FIG. 6), 50% (predetermined rate) of the side-betted credit as JP, based upon the BET information received at step S102.

Next, the CPU41 executes processing of determining cards dealt in a first card set (step S104). In this processing operation, the CPU41 determines banker's cards and players' cards, the players' cards being dealt to players having accepted entry for participation from the input device, based upon data of the first card set made of plural types of cards stored in the RAM42. Namely, seven cards to be dealt to each of the persons consisting of the players and the banker are determined from among one set of trump cards. The seven cards determined to be dealt to the player are equivalent to the player's card, and the seven cards determined to be dealt to the banker are equivalent to the banker's card. In addition, the CPU41 displays, in a faced down manner, the card images indicative of seven banker's cards, on the front panel display 21 (see FIG. 2) included in the game machine 1.

Next, the CPU41 judges whether or not the number of participants exceeds a predetermined number (step S105). In this processing operation, the CPU41 accepts participation from the station 3, and then, judges whether or not the number of players stored in the RAM42 exceeds a predetermined number of players. In the present embodiment, the predetermined number is 6. In a case where the judgment result is affirmative (S105: Yes), this CPU performs processing of determining cards dealt in the second card set (S106). If the above result is negative (S105: No), the routine proceeds to step S107.

Next, the CPU41 performs processing of determining cards dealt in the second card set (step S106). In this processing operation, the CPU41 reads data of the second card set made of a card identical to the first card set stored in the RAM42. Then, this CPU determines the players' cards dealt to the players having accepted participation in excess of the predetermined number of players, based upon the card data excluding the banker's cards dealt based upon the first card set.

Next, the CPU41 transmits dealt-card information (step S107). Specifically, the CPU41 transmits the dealt-card information to a station 3. Namely, the player's cards determined at step S104 or step S106 are dealt to the players having accepted participation. The dealt-card information includes information indicative of types of cards (numbers or alphabets and marks (heart, club, spade, and diamond)) determined to be dealt to the players and the banker. At the station 3, based upon the received dealt-card information, the liquid crystal display 10 displays card images indicative of seven player's cards, and then, accepts entry for dividing the images into a group of five cards (high hand) and a group of two cards (low hand).

Next, the CPU41 receives selection information from the station 3 (step S108). The selection information indicates which one of the cards dealt to the players has been selected as a high hand, and which one of the cards have been selected as a low hand.

Next, the CPU41 executes processing of determining a banker's high hand and low hand (step S109). In this processing operation, the CPU41 executes processing of dividing the cards dealt to the banker into a high hand and a low hand.

Next, the CPU41 discloses cards (step S110). Specifically, the CPU41 displays in a faced up manner on the front panel display 21 the card images indicative of the high hand and the low hand determined at the step S109.

Next, the CPU41 performs winner-loser determination processing (step S111). In this processing operation, the CPU41 executes processing of determining a winner or loser, based upon the selection information received at the step S108 and the high hand and the low hand determined at step S109. Namely, this CPU executes processing of determining a winner or loser after comparing the players' hands of the cards dealt to the players and the banker's card hands. Specifically, it is judged as to which one of the players' hands is strong or weak after comparing the players' high hands with the banker's high hand. In addition, it is also judged as to which one is strong or weak after comparing the players' low hands with the banker's low hand. Further, the winner or loser is determined based upon the judgment results. Specifically, in a case where the player's high hand is stronger than the banker's high hand and in a case where the player's low hand is stronger than the banker's low hand, it is judged to be the player's win. In a case where the banker's high hand is stronger than the player's high hand and in a case where the banker's low hand is stronger than the player's low hand, it is judged to be the banker's win. Even if the player is stronger at one of the high and low hands, in a case where the banker is stronger at the other one, it is judged to be "draw".

Next, the CPU41 transmits winner-loser information (step S112). Specifically, the CPU41 transmits to the station 3 the information indicative of the winner or loser determined at the step S111 (hereinafter, referred to as winner-loser information). Upon the receipt of the winner-loser information, based upon the received winner-loser information, the liquid crystal display 10 displays any one of the images inclusive of messages "You Win", "You Lose", and "Draw".

Next, the CPU41 performs processing of transmitting normal-BET payout information (step S113). In this processing operation, the CPU41 transmits the normal-BET payout information to the station 3. The normal-BET payout information is generally indicative of an amount of credit (currency values) to be paid out to BET. Specifically, in a case where the player has won, this CPU transmits information indicative of credit of which amount is twice of that of normal BET. In a case where the outcome of the game is "draw", the CPU transmits information indicative of credit of which amount is equal to that of normal BET. In addition, in a case where the banker has won, the CPU transmits information indicative of the fact that an amount of given credit is 0.

Figure 11A:
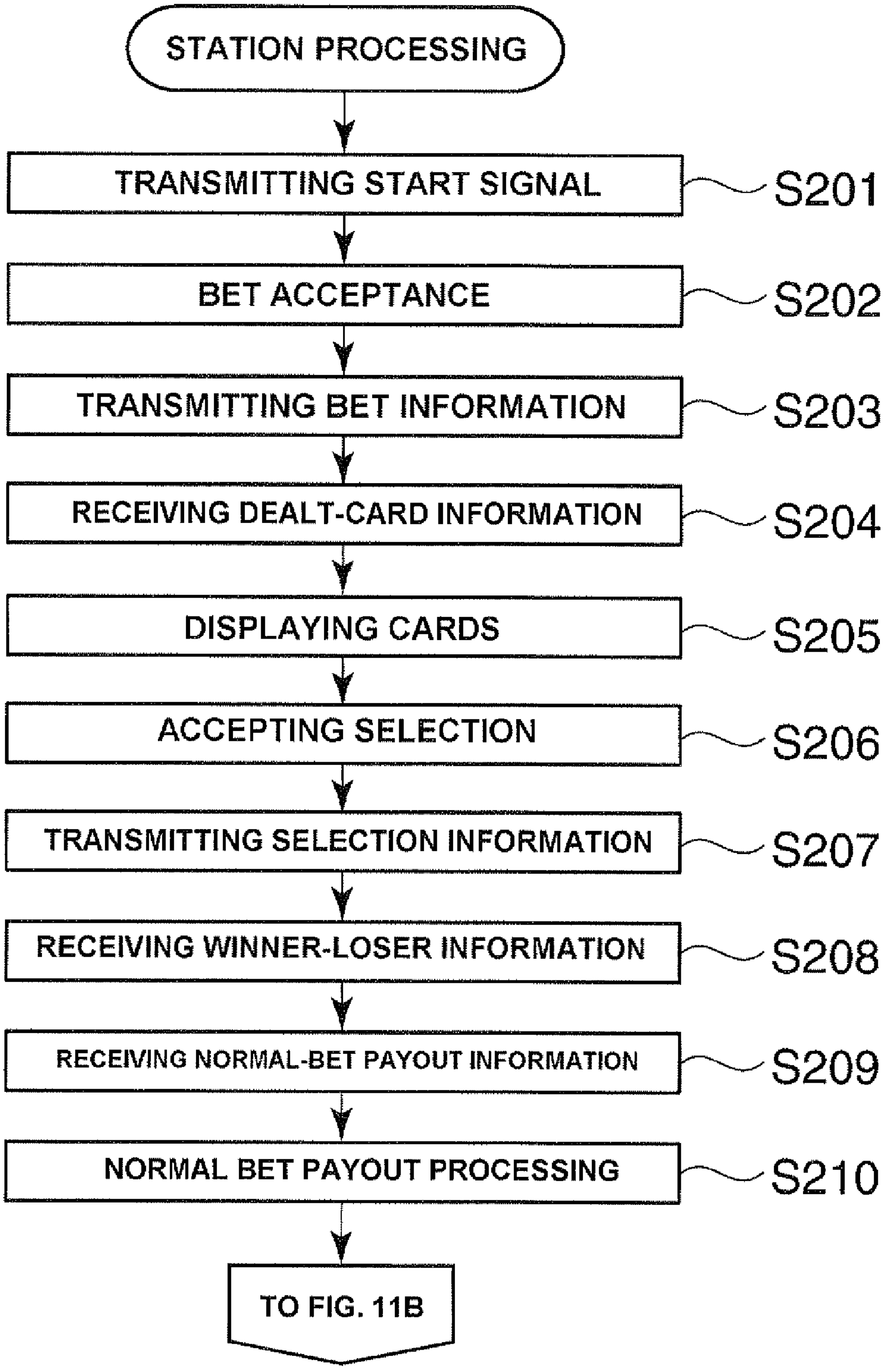
FIG. 11A is a flowchart showing a subroutine of station processing executed at the stations according to the first embodiment.
Figure 11B:
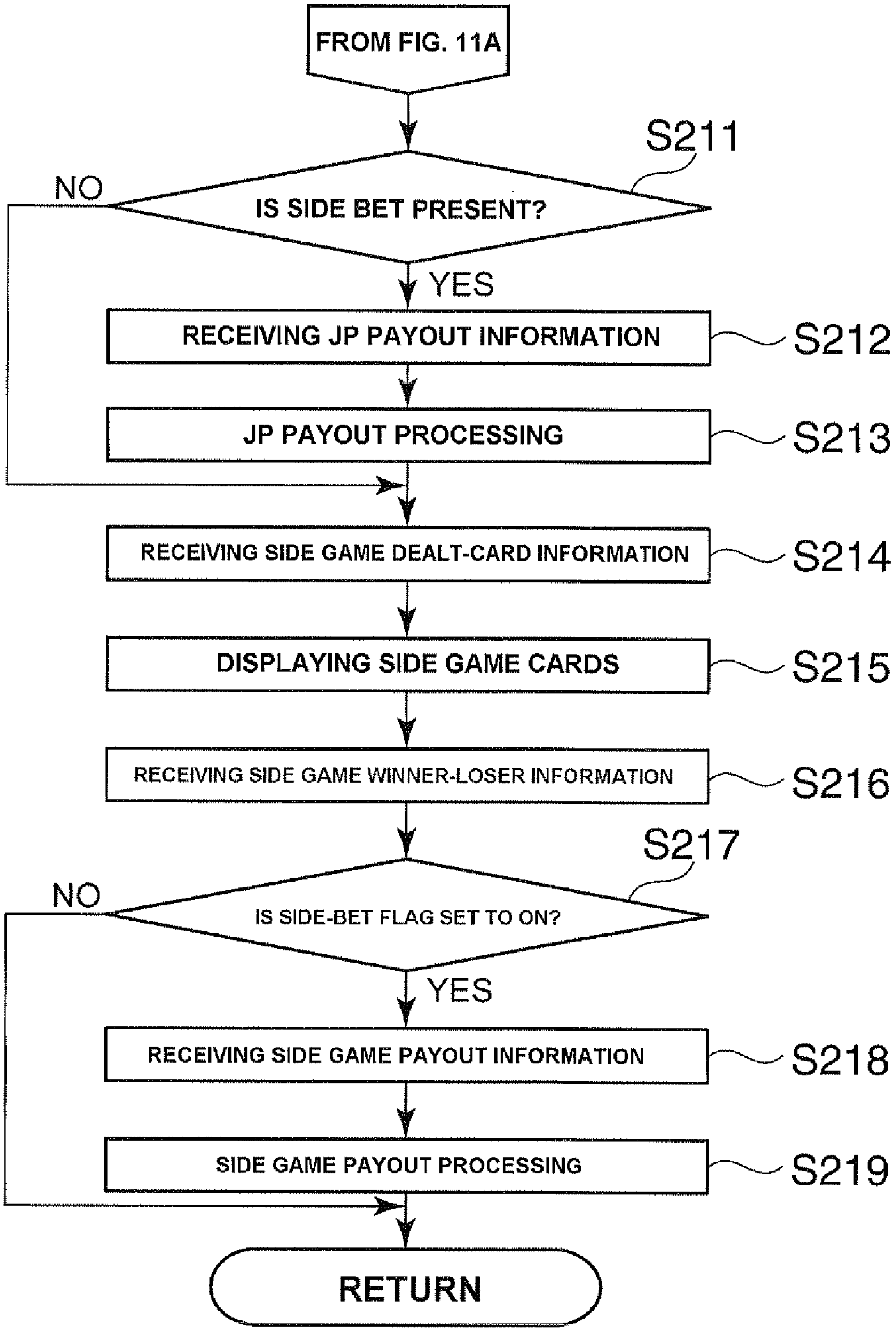
FIG. 11B is a flowchart showing a subroutine of station processing executed at the stations according to the first embodiment.

Next, in FIG. 11B, the CPU41 judges whether or not a side BET signal has been received (step S114). Specifically, the CPU41 judges whether or not a signal has been received indicative of the fact that the side BET has been performed. When the CPU41 judges that no side BET signal has been received (step S114: NO), the routine proceeds to step S115.

On the other hand, when it is judged that a side BET signal is received (step S114: YES), JP payout information is transmitted to the station 3 (step S115). The JP payout information is indicative of the amount of JP credit (currency value) to be paid out to the side BET. Specifically, in a case where the player has won, when a high hand is "Royal Flush", the CPU41 transmits information indicative of credit equivalent to a total amount of JP. When the player's high hand is "Straight Flush", this CPU transmits information indicative of credit equivalent to 50% of JP, and when the player's high hand is a hand other than the above, this CPU transmits information indicative of a credit equivalent to 10% of JP. In addition, in the case where the result is "draw", this CPU transmits information indicative of a credit of which amount is equal to that of a side BET. Moreover, in a case where the banker has won, this CPU transmits the fact that the amount of credit given is 0.

While the embodiment of the present invention describes a case in which, when the player has won in a PAIGOW poker at the time of side BET, where the high hand is "Royal Flush", 100% of JP is given, where the high hand is a "Straight Flush", 50% of JP is given, and where the high hand is a hand other than the above combination, 10% of JP is given. In the embodiment of the present invention, a correspondence relationship between the amount of JP given and a hand is not limitative thereto. In the present invention, further, in a case where the player has won in the PAIGOW poker at the time of side BET, all of the currency values accumulatively stored as JP may be given, regardless of the hand.

The embodiment of the present invention described a case in which a correspondence relationship between a player's hand and a payment (JP) to be paid out, in the PAIGOW poker at the time of side BET is preset. In the present invention, however, the correspondence relationship between the player's hand and the payment to be paid out may be randomly varied every time the PAIGOW poker is performed at the time of a side BET.

Further, while the embodiment of the present invention describes a case of paying out credit of which amount is equal to that of side BET in a case where the result is "draw", the above payout of the credit may not be performed.

Next, the CPU41 judges whether or not a side game trigger is established (step S116). Specifically, the CPU41 executes the programs stored in the ROM43, thereby sampling random number values from among the numeric range of predetermined random number values and judging whether or not a side game trigger is established based upon the sampled random number values. The CPU41 terminates main control unit processing when it executes the processing of step S114 upon judging that a side game trigger has not been established (step S116: NO). In another embodiment of the present invention, further, judgment of whether or not a side game trigger is established is made based upon whether or not a side BET has been performed in advance.

On the other hand, upon judging that a side game trigger has been established (step S116: YES), the CPU41 receives side game BET information from the station 3 (see FIG. 2) (step S117).

Next, the CPU41 executes processing of determining cards dealt in a side game (step S118). In this processing operation, the CPU41 randomly determines five cards dealt to the players from among one or plural groups of trump cards.

Next, the CPU41 transmits information on cards to be dealt in the side game (step S119). Specifically, the CPU41 transmits, to the station 3, information on cards dealt in the side game. The side game dealt-card information includes information indicative of suits (numbers or alphabets and marks (heart, club, spade, and diamond)) of the cards determined to be dealt to the players. At the station 3, based upon the received dealt-card information, the liquid crystal display 10 displays a card image indicative of the five player's cards. Alternatively, the five cards at the high hand of the player's cards dealt in advance in a basic game prior to a side game may be used.

Next, the CPU41 discloses all of the player's cards (step S120). Specifically, the CPU41 displays, in a faced up manner on the front panel display 21 on a player-by-player basis, the five-card images of the players' cards determined at step S119 (see FIG. 13). In this case, the player can view the cards that were placed and arranged.

Next, the CPU41 extracts the side betted player's cards (step S121). Specifically, the CPU41 extracts five side betted player's cards, based upon the side game BET information received at step S117.

Next, the CPU41 performs side game winner-loser determination processing (step S122). In this processing operation, the CPU41 executes processing of determining a winner or loser, based upon cards of the side game of all players having accepted the side BET disclosed at step S120. Namely, this CPU determines a payment, based upon a combination of cards included in the player's cards displayed on a front panel display. The CPU41 determines a payment in accordance with a payment data table that is based upon the predetermined combinations stored in the RAM42. For example, in a case where combinations of giving a payment include a "straight" and the player's combination is "straight" (see FIG. 9), processing is performed so that a predetermined payment can be given to this player.

In other embodiments, further, a payment is given to the strongest combination while the players' cards are compared with each other. Specifically, it is judged as to which one of the players' hands is strong or weak after comparing all of the players' cards, and a winner or loser is determined based upon the judgment result. Here, any one of the predetermined combinations is established in the five player's cards, and it is judged as to which one of the players' cards is strong or weak. The predetermined combinations designate "Royal Flush", "Straight Flush", "Four of a Kind", "Full House", "Flush", "Straight", "Three of a Kind", "Two Pairs", "One Pair", and "No Pair" in sequential order from the strongest combination of the five cards.

Next, the CPU41 transmits side game winner-loser information (step S123). Specifically, the CPU41 transmits to a station 3 the winner-loser information indicative of a winner or loser of the side game determined at step S120. The station 3 displays any one of the images inclusive of the messages "You Win", "You Lose", and "Draw" on the liquid crystal display 10, based upon winner-loser information, upon the receipt of the winner-loser information (see FIGS. 9B and 10).

Next, the CPU41 transmits side game payout information to the station 3 (step S124). The side game payout information is indicative of the amount of credit (currency value) to be paid out to the side game. The CPU41 determines a payment (payout information), based upon the side game winner-loser information, and then, transmits payout information to the station 3. Namely, the determined payment is given to the player. Specifically, the CPU41 transmits information indicative of the credit determined based upon the combinations "Royal Flush", "Straight Flush", "Four of a Kind", "Full House", "Flush", "Straight", "Three of a Kind", "Two Pairs", "One Pair", and "No Pair".

In an alternate embodiment, further, the CPU41 compares the players' cards displayed on the front panel display 21, and then, transmits information indicative of a payment to a player who realized the highest combination among the compared cards. The CPU41 terminates main control unit processing when the processing at the step S124 is executed.

Next, the processing performed at the station 3 will be described in detail. FIGS. 11A and 11B are flowcharts showing subroutines of the station processing executed at the station, according to the first embodiment. In the station processing, first, a CPU51 included in the station 3 performs start signal transmission processing (step S201). In this processing operation, the CPU51 transmits a start signal to the main control unit 40 upon the receipt of a signal indicative of the fact that the touch panel 11 has sensed a touch or that the inserted-coin detecting section 68 has detected coin insertion. In this manner, the processing operations shown in FIGS. 10A and 10B are executed at the main control unit 40.

Next, the CPU51 accepts entries of the normal BET and side BET (step S202). This allows the player to enter the normal BET and the side BET via the touch panel 11 included in the station 3. Upon the receipt of a signal indicative of the fact that entry of the side BET has been made, the CPU51 sets a side-BET flag. This side-BET flag is set in a case where entry of the side BET has been made.

Next, the CPU51 transmits to the main control unit 40, BET information serving as information pertinent to an input BET (step S203). Upon the receipt of the BET information, the main control unit 40 determines cards to be dealt to the players and the banker (see step S103 of FIG. 11A).

Next, the CPU51 receives from the main control unit 40 the dealt-card information indicative of the cards dealt to the players (step S204). Specifically, the CPU51 receives the dealt-card information transmitted at step S104 of FIG. 11A, and then, stores the received information in a RAM.

Next, the CPU51 displays cards (step S205). Specifically, the CPU51 displays at the dealt-card display section 83 of the liquid crystal display 10 (display corresponding to the players having accepted entry for participation) the card images indicative of the seven player's cards, based upon the players' card information stored in a RAM52, which were received at step S204. In addition, such display processing is also executed for the display devices corresponding to the players having accepted entry for participation in excess of a limited number of players.

Next, the CPU51 accepts entry for selecting high hands and low hands (step S206). This allows the players to determine high hands and low hands from among the dealt cards by operating a high hand determination button 84 and a low hand determination button 85 via the touch panel 11.

Next, the CPU51 transmits to the main control unit 40 the selection information that is based upon selection of high hands and low hands (step S207). Upon the receipt of the selection information, the main control unit 40 determines a high hand and a low hand of the banker's cards, and then, executes processing of determining a winner or loser (see step S108 of FIG. 11A).

Next, the CPU51 receives winner-loser information from the main control unit 40 (step S208). Subsequently, the dealt-card display section 83 of the liquid crystal display 10 displays any one of the images inclusive of the messages "You Win", "You Lose", and "Draw", during a predetermined period of time, based upon the received winner-loser information.

Next, the CPU51 receives normal-BET payout information from the main control unit 40 (step S209). Upon the receipt of the normal-BET payout information, the CPU51 stores in the RAM52 the credit data that is based upon the normal-BET payout information.

Next, the CPU51 receives normal-BET payout information, based upon the normal-BET payout information received at step S209 (step S210). In this normal-BET payout processing, in a case where a player has won, payout is performed, based upon information indicative of a credit of which amount is twice of that of the normal BET; and in a case where the result is "draw", payout is performed, based upon information indicative of a credit of which amount is equal to that of the normal BET. In addition, in a case where the banker has won, information indicative of the fact that the amount of credit to be given is 0 is displayed.

Next, in FIG. 8B, the CPU51 judges whether or not entry of side BET has been made, while in the BET acceptance at step S202 (step S211). Specifically, the CPU51 judges whether or not a side-BET flag is set. When the CPU51 judges that entry of the side BET has not been made (step S211: NO), the routine proceeds to step S214.

On the other hand, upon judging that entry of the side BET has been made (step S211: YES), the CPU51 receives JP payout information (step S212). Specifically, the CPU51 receives JP payout information from the main control unit 40. Upon the receipt of the JP payout information, the CPU51 stores in the RAM52 the credit data that is based upon the JP payout information.

Next, the CPU51 executes JP payout processing (step S213). Specifically, the CPU51 pays out credit, based upon the JP payout information received at step S212.

Next, the CPU51 receives, from the main control unit 40, the side game dealt-card information indicative of the cards dealt to the players in a side game (step S214). Specifically, the CPU51 receives the dealt-card information transmitted at step S117 of FIG. 11B.

Next, the CPU51 displays side-game cards (step S215). Specifically, the CPU51 displays the card image indicative of the five player's cards at the dealt-card display section 83 of the liquid crystal display 10, based upon the side game dealt-card information received at step S214.

Next, the CPU51 receives side game winner-loser information from the main control unit 40 (step S216). Then, the dealt-card display section 83 of the liquid crystal display 10 displays any one of the images inclusive of the messages "You Win", "You Lose", and "Draw", during a predetermined period of time, based upon the received winner-loser information.

Next, the CPU51 judges whether or not a side-BET flag is set to ON (step S217). Specifically, the CPU51 judges whether or not entry of a side BET is made during BET acceptance of step S202, and the side-BET flag is set. When the CPU51 judges that the side-BET flag is not set to ON (step S217: NO), the CPU51 terminates station processing when the processing of step S217 is executed.

On the other hand, at the time of judging that the side-BET flag is set to ON (step S217: YES), the CPU51 receives side game payout information (step S218). Upon the receipt of the side game payout information, the CPU51 stores in the RAM52 the credit data that is based upon the side game payout information.

Next, the CPU51 executes side game payout processing, based upon the side game payout information received at step S218 (step S219). In this processing operation, in a case where a combination of the side-betted players' cards is a predetermined combination, a credit is paid out based upon the side game payout information received at step S218.

Next, a game machine 1 according to a second embodiment will be described in detail with referring to the drawings. The game machine 1 according to the second embodiment that follows has an appearance and a circuit construction or the like, which are similar to those of the game machine 1 according to the first embodiment of the present invention. Thus, a duplicate description of like construction is omitted here. The game machine 1 and the corresponding constituent elements are designated by the same reference numerals, and are explained.

Figure 12:
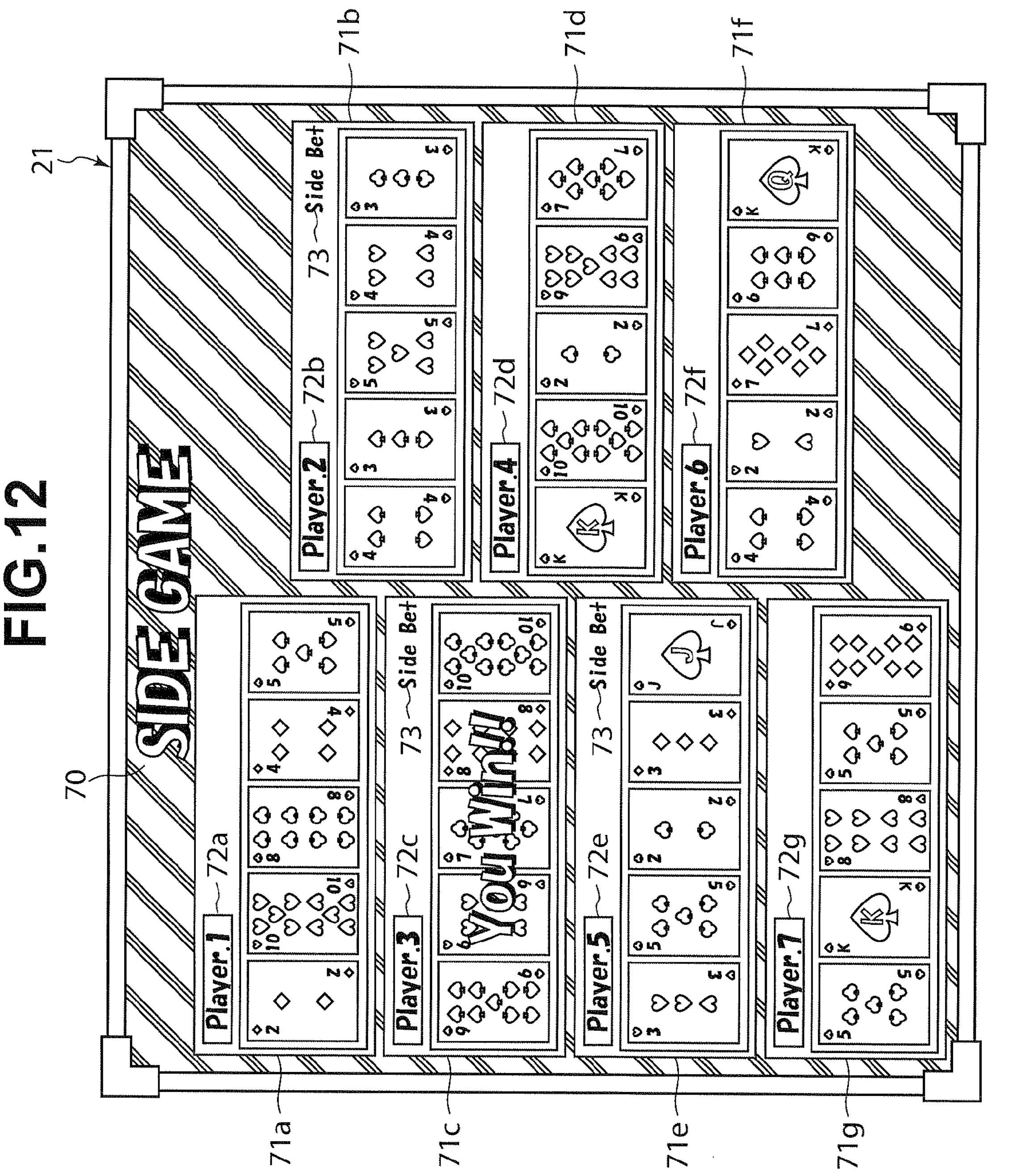
FIG. 12 is a view showing an exemplary image displayed on a liquid crystal display included in each of the stations while in a side game according to the first embodiment.

As shown in FIG. 12, when a side game is started, the side game display 70 is displayed on the front panel display 21. On condition that a player has made a side BET, among the players of all of the stations 3*a* to 3*e*, five-card images 71*a* to 71*g* of high hands, for example, of the cards dealt to a player having made the side BET, are displayed on the front panel display 21. The corresponding card images 71*a* to 71*g* of the players' hands are displayed at the lower sides of the player number displays 72*a* to 72*g*. In a case where a side BET is performed, further, a side BET display 73 is displayed at the right side of each of the player number displays 72*a* to 72*g*. The combinations of the players' cards of the stations 3*a* to 3*g* are judged, and then, the winner-loser information display 73 is displayed as to a player who realized a predetermined combination. Because a combination of the "straight" cards was the strongest among the players (player 2, player 3, and player 5) having made the side BET of all of the stations 3*a* to 3*g*, a winner-loser information display 79 ("You Win") is displayed on that card 71*c*, and then, the player receives a predetermined payout.

Figure 13A:
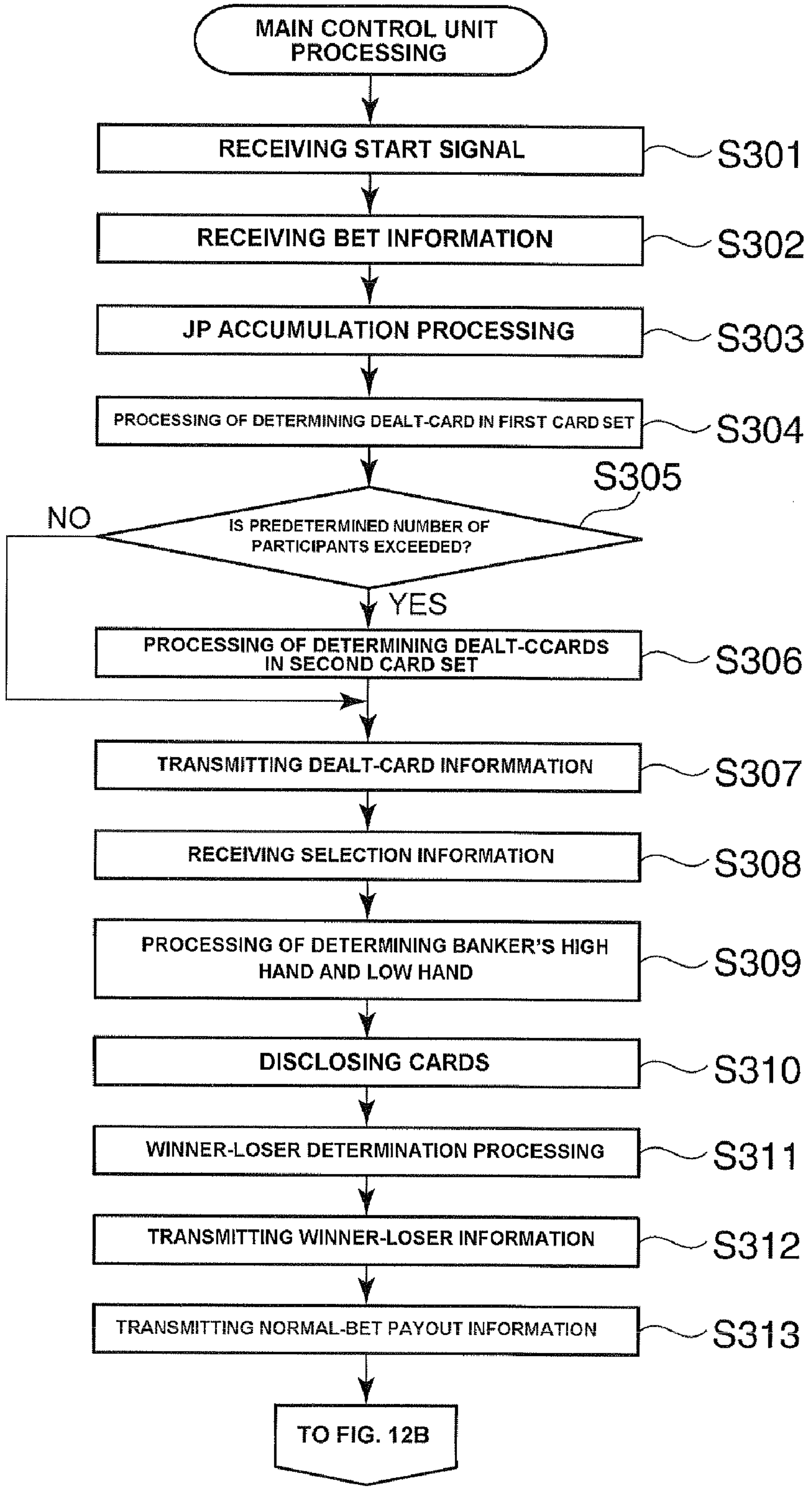
FIG. 13A is a flowchart showing a main control unit processing executed at the main control unit included in a game machine according to a second embodiment.
Figure 13B:
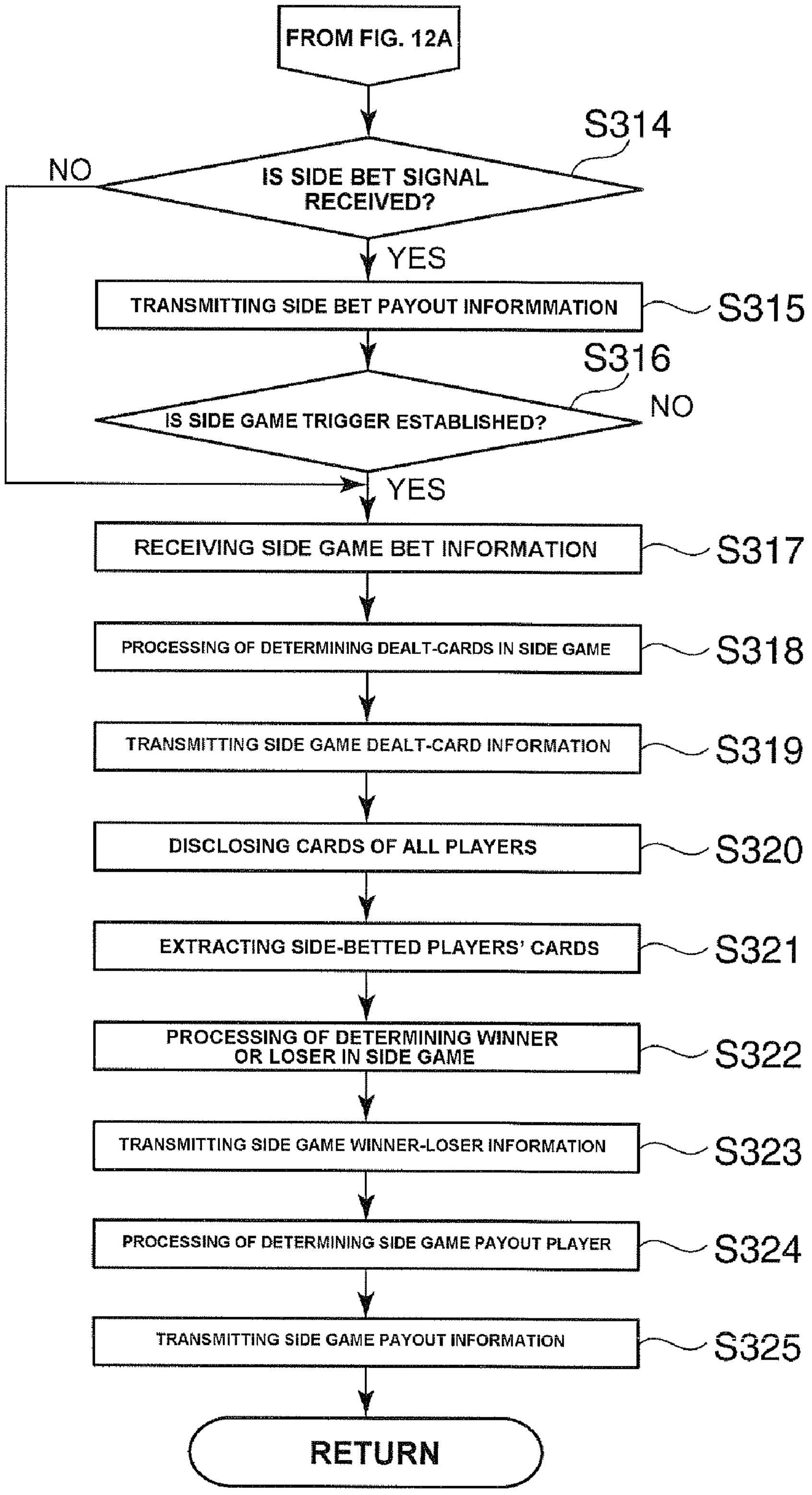
FIG. 13B is a flowchart showing a main control unit processing executed at the main control unit included in the game machine according to the second embodiment.

Next, a processing operation performed at the main control unit 40 and the station 3, will be described in detail. FIGS. 13A and 13B are flowcharts showing main control unit processing executed at the main control unit included in the game machine according to the second embodiment. In this processing operation, first, the CPU41 included in the main control unit 40 receives a start signal (step S301). After that, this CPU performs the processing operations of steps S302 to S311. These processing operations are identical to those of steps S101 to S113 shown in FIG. 11A. Thus, a duplicate description thereof is omitted here.

Next, in FIG. 13B, the CPU41 judges whether or not a side BET signal has been received (step S314). Specifically, this CPU judges whether or not a signal indicative of the fact that a side BET is underway has been received. When the CPU41 judges that no side BET signal has been received (step S314: NO), the routine proceeds to step S115.

On the other hand, at the time of judging that the side BET signal has been received (step S314: YES), the CPU41 transmits JP payout information to the station 3 (step S315). The JP payout information is indicative of the amount of JP credit (currency value) paid out to a side BET.

Next, the CPU41 judges whether or not a side game trigger is established (step S316). Specifically, the CPU41 executes programs stored in the RAM42, thereby sampling random number values from among a predetermined numeric range of the random number values. Then, this CPU judges whether or not a side game trigger has been established, based upon the sampled random number values. Upon judging that no side game trigger has been established (step S316: NO), the CPU41 terminates main control unit processing when the processing of step S314 is executed. In another embodiment of the present invention, further, it is judged whether or not a side game trigger is established, in accordance with the side BET has been performed in advance.

At the time of judging that the side game trigger has established (step S316: YES), the CPU41 receives side game BET information from the station 3 (see FIG. 2) (step S317).

Next, the CPU41 executes side game dealt-card determination processing (step S318). In this processing operation, the CPU41 randomly determines five cards dealt to each of the players, from among one group of trump cards.

Next, the CPU41 transmits side game dealt-card information (step S319). Specifically, the CPU41 transmits the side game dealt-card information to the station 3. The side game dealt-card information contains information indicative of the types of cards determined to be dealt to the players (numbers or alphabets and marks (heart, club, spade, and diamond)). At the station 3, the liquid crystal display 10 displays a card image indicative of the five player's cards, based upon the received dealt-card information. Alternatively, the five high-hand player's cards dealt in advance in a basic game prior to a side game may be used.

Next, the CPU41 discloses all players' cards (step S320). Specifically, the CPU41 controls the front panel display 21 to display the five-card images determined at step S319 in a faced up manner.

Next, the CPU41 extracts the side-betted players' cards (step S321). Specifically, the CPU41 extracts the side betted five player's cards, based upon the side game BET information received at step S117.

Next, the CPU41 performs side game winner-loser determination processing (step S322). In this processing operation, the CPU41 executes processing of determining a winner or loser, based upon the side game cards of all of the players disclosed at step S320. Namely, this CPU determines a payment, based upon combinations of the cards included in the players' cards displayed on the front panel display. The CPU41 determines a payment in accordance with a payment data table that is based upon the predetermined combinations stored in the RAM42. For example, in a case where a combination of giving a payment includes "straight" and the player's combination is "straight" (see FIG. 9), processing is performed so that a predetermined payment can be given to this player.

In addition, another embodiment assumes that a payment is given to the strongest combination after the players' cards have been compared with each other. Specifically, it is judged as to which one of the players' hands is strong or weak after comparing the cards of all of the players with each other, and a winner or loser is determined based upon the judgment result. Further specifically, any one of the predetermined combinations is established in the five player's cards, and it is judged as to which one of the players' hands of the cards in combination is strong or weak. The predetermined combinations designate "Royal Flush", "Straight Flush", "Four of a Kind", "Full House", "Flush", "Straight", "Three of a Kind", "Two pairs", "One Pair", and "No Pair" in sequential order from the strongest combination of the five cards.

Next, the CPU41 transmits side game winner-loser information (step S323). Specifically, the CPU41 transmits winner-loser information indicative of a winner or loser in a side game determined at step S322 to the player of the station 3 determined at step S323. At the station 3, upon the receipt of the winner or loser information, any one of the images inclusive of the messages "You Win", "You Lose", and "Draw" is displayed on the liquid crystal display 10, based upon the received information (see FIGS. 9B and 10).

Next, the CPU41 executes processing of determining a side game payout player (step S324). Specifically, the CPU41 determines a player targeted for paying out the credit determined based upon a poker combination from among the players having accepted side BET.

Next, the CPU41 transmits side game payout information to the station 3 (step S325). The side game payout information is indicative of the amount of credit (currency value) to be paid out relative to a side game. Specifically, this CPU transmits information indicative of the credit determined based upon the combinations "Royal Flush", "Straight Flush", "Four of a Kind", "Full House", "Flush", "Straight", "Three of a Kind", "Two pairs", "One Pair", and "No Pair". In another embodiment, further, this CPU compares the players' cards displayed on the front panel display 21, and transmits information indicative of a payment to a player who realized the highest combination among them. The CPU41 terminates main control unit processing when the processing at step S324 is executed.

While the present embodiment described a case in which the predetermined number is 6, the number may be 1 or 2 or more. In a case where the predetermined number is 1, one group of card sets made of a plurality of types on a player-by-player basis is employed, so that a one-to-one game can be performed on the card set while the banker's cards are used in common. While the present embodiment described determining a player targeted for paying out the credit determined based upon a poker combination from among the players having accepted side BET on condition that side BET has been accepted in a side game, the determination may be made on condition that a normal BET has been accepted.

While the present embodiment described determining which one of the players' hands is strong or weak after comparing the cards of all players, and then, determining a winner or loser, based upon the judgment result, in a side game, it is judged as to which one of the players' cards is strong or weak after comparing them with the banker's cards, thereby determining a winner or loser, based upon the judgment result. Then, a payment may be distributed among winning players. In this case, the distribution of the payment is controlled based upon a predetermined distribution table data so that a payment of a high hand becomes higher.

While the present embodiment described a case in which a PAIGOW poker is performed, the present invention is not limitative in particular as long as a game is executed in which the players' cards and the banker's cards respectively are divided into two groups and the players compete against the banker. That is, while the present embodiment described a case in which the players' and banker's cards dealt on a seven-by-seven cards basis are divided into a group of five cards and a group of two cards, the present invention is not limitative thereto in terms of the number of cards before and after divided into two groups.

While the present embodiment described a case in which trump cards (playing cards) are employed, the cards (the players' cards and the banker's cards) of the present invention are not limitative to the trump cards. For example, other cards such as tarot cards, trading cards, Japanese flower cards, domino cards, and mah-jongg tiles may be employed. Further, while the present embodiment described a case in which the dealer takes over the banker, the present invention is not limitative thereto. In a case where a plurality of players participates in games, one of the players may take over the banker.

Further, while the present embodiment described a case in which players execute a PAIGOW poker while observing the main monitor 2 and the liquid crystal display 10 included in the station 3, the game machine of the present invention may be equipped with a main monitor or a liquid crystal display (included in a station). In such a case, the game machine may be constituted so that the dealer's (banker's) cards and the player's cards may be displayed on the main monitor or the station display.

In the present embodiment, the method of playing cards is implemented by the CPU executing it. While, in the present embodiment, programs are stored in the ROM43 and the ROM53, they may be stored in the RAM42 and the RAM52. While, in the present embodiment, the dealer takes over the banker, the player may take over the banker. Further, while, in the present embodiment, the predetermined number of players is 6, the number is not limitative thereto.

While the embodiment according to the present invention has been described, the description presents only some of the specific examples and is not intended to limit the present invention in any way and specific constructions of each means and the like can be properly changed in terms of design. Besides, the effects described in the embodiment of the present invention are only the most preferable effects generated from the present invention and the effects to be caused by the present invention is not limitative thereto.

The more important features of the invention have thus been outlined, rather broadly, in order that the aforementioned detailed description thereof may be better understood, and in order that the present contribution to the art may be better appreciated. There are, of course, additional features of the invention that were described above and which formed the subject matter of the claims appended hereto. In this respect, upon explaining at least one embodiment of the invention in detail, it is to be understood that the invention is not limitative in its application to the details of construction and to the arrangements of the components set forth in the aforementioned description or illustrated in the drawings. According to the invention, other embodiments can be variously practiced and carried out as well. Also, it is to be understood that the phraseology and terminology employed herein are merely intended for the descriptive purpose and should not be regarded as limiting. As such, those skilled in the art will appreciate that the conception, upon which this disclosure is based, may readily be utilized as a basis for the designing of other systems and methods for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way. These matters together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matters in which there are illustrated preferred embodiments of the invention.

The detailed descriptions aforementioned may be presented in terms of program procedures executed on a computer or network of computers. These procedural descriptions and representations are the means used by those skilled in the art to most effectively convey the substance of their work to others skilled in the art. A procedure is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities. Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine and/or manual operations. Useful machines for performing the operation of the present invention include general purpose digital computers or similar devices. The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general-purpose machines may be used with programs written in accordance with the teachings herein, or it may prove more convenient to construct more specialized apparatus to perform the required method steps. The required structure for a variety of these machines will appear from the description given.

What is claimed is:

1. A game machine, comprising:

a plurality of display devices provided corresponding to respective ones of a plurality of players;

a plurality of input devices provided corresponding to respective ones of said plurality of players for accepting entry for participation by the players;

a memory for storing first card set data inclusive of plural types of card data, second card set data inclusive of card data identical to cards included in the first card set data, and the number of players accepting entry for participation by the input device;

a controller for controlling the display device, the input device, and the memory, the controller being programmed to:

(a) execute processing of accepting from the input device entry for participation by one or more players of said plurality of players;

(b) determine banker's cards and players' cards, the players' cards being dealt to players having accepted entry for participation from the input device, based upon the first card set data stored in the memory;

(c) among the plurality of display devices, execute processing of displaying the players' cards determined in (b) on the display devices corresponding to the players having accepted entry for participation;

(d) in a case where the number of players having accepted entry for participation stored in the memory exceeds a predetermined number of players, determine the players' cards to be dealt to the players having accepted entry for participation in excess of the predetermined number of players, based upon card data excluding the banker's cards dealt based upon the first card set data among the second card set data stored in the memory;

(e) execute processing of displaying the players' cards determined in (d) on the display devices corresponding to the players having accepted entry for participation in excess of the predetermined number of players among the plurality of display devices; and (f) execute processing of determining a winner or loser after comparing hands of the players' cards dealt to the players having accepted entry for participation and a hand of the banker's cards.

2. The game machine according to claim 1, further comprising a common display device used in common by the plurality of players, the controller being programmed to:

(g) display the players' cards on the common display device on a player-by-player basis;

(h) determine a payment, based upon a combination of cards included in the players' cards displayed on the common display device; and (i) give a payment to the players in accordance with the determined payment.

3. The game machine according to claim 1, wherein:

the controller is programmed to:

(j) execute processing of accepting from one or more of the plurality of players a side BET different from a normal BET from the input device, the controller determining a payment, based upon a combination of the players' cards of the players having accepted the side BET, from among the players' cards in the processing of (h); and giving a payment to the players having accepted the side BET in the processing of (i).

4. A game machine, comprising:

a plurality of display devices provided corresponding to respective ones of a plurality of players;

a common display device used in common by the plurality of players a plurality of input devices provided corresponding to respective ones of the plurality of players for accepting entry for participation by one or more of the plurality of players;

a memory for storing first card set data inclusive of plural types of card data, second card set data inclusive of card data identical to cards included in the first card set data, and number of players having accepted entry for participation by the input device;

a controller for controlling the display device, the input device, and the memory, the controller being programmed to:

(a) execute processing of accepting entry for participation from the input device;

(b) determine banker's cards and players' cards, the players' cards being dealt to the players having accepted entry for participation from the input device, based upon the first card set data stored in the memory;

(c) among the plurality of display devices, execute processing of displaying the players' cards determined in (b) on the display devices corresponding to the players having accepted entry for participation;

(d) in a case where the number of players having accepted entry for participation stored in the memory exceeds a predetermined number of players, determine the players' cards to be dealt to the players having accepted entry for participation in excess of the predetermined number of players, based upon card data excluding the banker's cards dealt based upon the first card set data among the second card set data stored in the memory;

(e) execute processing of displaying the players' cards determined in (d) on the display devices corresponding to the players having accepted entry for participation in excess of the number of players among the plurality of display devices;

(f) execute processing of determining a winner or loser after comparing hands of the players' cards dealt to the players having accepted entry for participation and a hand of the banker's cards;

(g) display the players' cards on the common display device on a player-by-player basis;

(h) determine a payment, based upon a combination of cards included in the players' cards displayed on the common display device; and (i) give a payment to the players having accepted entry for participation in accordance with the determined payment.

5. The game machine according to claim 4, wherein:

the controller is programmed to:

(j) execute processing of accepting from one or more of the plurality of players a side BET different from a normal BET from the input device, the controller determining a payment, based upon a combination of the players' cards of the players having accepted the side BET, from among the players' cards in the processing of (h) and giving a payment to the players having accepted the side BET in the processing of (i).

6. A game machine, comprising:

a plurality of display devices provided corresponding to respective ones of a plurality of players;

a common display device used in common by the plurality of players;

a plurality of input devices provided corresponding to respective ones of the plurality of players for accepting from one or more of the plurality of players entry for participation by said one or more of the plurality of players and a side BET;

a memory for storing first card set data inclusive of plural types of card data, second card set data inclusive of card data identical to cards included in the first card set data, and the number of players accepting entry for participation by the input device;

a controller for controlling the display device, the input device, and the memory, the controller being programmed to:

(a) execute processing of accepting entry for participation from the input device and the side BET;

(b) determine banker's cards and players' cards, the players cards being dealt to the players having accepted entry for participation from the input devices, based upon the first card set data stored in the memory;

(c) among the plurality of display devices, execute processing of displaying the players' cards determined in (b) on the display devices corresponding to the players having accepted entry for participation;

(d) in a case where the number of players having accepted entry for participation stored in the memory exceeds a predetermined number of players, determine the players' cards to be dealt to the players having accepted entry for participation in excess of the predetermined number of players, based upon card data excluding the banker's cards dealt based upon the first card set data among the second card set data stored in the memory;

(e) execute processing of displaying the players' cards determined in (d) on the display devices corresponding to the players having accepted entry for participation in excess of the predetermined number of players among the plurality of display devices;

(f) execute processing of determining a winner or loser after comparing hands of the players' cards dealt to the players having accepted entry for participation and a hand of the banker's cards;

(g) display the players' cards on the common display device on a player-by-player basis;

(h) determine a payment, based upon a combination of cards included in the players' cards of the players having accepted the side BET among the players' cards displayed on the common display device; and (i) give a payment to the players having accepted the side BET in accordance with the determined payment.

7. A method of playing card games using a gaming machine with a processor to do so, the method comprising the steps of:

(a) via the processor, accepting participation by a number of players;

(b) via the processor, determining banker's cards and players' cards, the players' cards being dealt to the players having accepted participation, from a first card set consisting of plural types of cards;

(c) via the processor, dealing the players' cards determined at the step (b) to the players having accepted participation;

(d) in a case where the number of players having accepted participation exceeds a predetermined number of players, determining via the processor the players' cards to be dealt to the players having accepted participation in excess of the predetermined number of players, based upon cards excluding the banker's cards dealt based upon the first card set among a second card set that consists of cards identical to those of the first card set;

(e) via the processor, dealing the players' cards determined at the step (d) to the players having accepted participation in excess of the predetermined number of players; and (f) via the processor, determining a winner or loser after comparing hands of the players' cards dealt to the players and a hand of the banker's cards.

8. The method of playing card games according to claim 7, further comprising the steps of:

(g) via the processor, placing and arranging the players' cards so as to be viewed from the players;

(h) via the processor, determining a payment based upon a combination of cards included in the players' cards placed at the step (g); and (i) via the processor, giving a payment to the players in accordance with the determined payment.

9. The method of playing card games according to claim 8, further comprising the step of (j) via the processor, accepting a side BET different from a normal BET, the step (h) including the step of determining via the processor a payment based upon a combination of the players' cards of the players having accepted the side BET, among the players' cards, the step (i) including the step of giving via the processor a payment to the players having accepted the side BET.

10. A method of playing card games using a gaming machine having a processor to do so, the method comprising the steps of:

(a) via the processor, accepting participation of a number of players;

(b) via the processor, determining banker's cards and players' cards, the players' cards being dealt to the players having accepted participation, from a first card set consisting of plural types of cards;

(c) via the processor, dealing the players' cards determined at the step (b) to the players having accepted participation;

(d) in a case where the number of players having accepted participation exceeds a predetermined number of players, determining via the processor the players' cards to be dealt to the players having accepted participation in excess of the predetermined number of players, based upon cards excluding the banker's cards dealt based upon the first card set among a second card set that consists of cards identical to those of the first card set;

(e) via the processor, dealing the players' cards determined at the step (d) to the players having accepted entry for participation in excess of the predetermined number of players;

(f) via the processor, determining a winner or loser after comparing hands of the players' cards dealt to the players and a hand of the banker's cards;

(g) via the processor, placing and arranging the players' cards so as to be viewed from the players;

(h) via the processor, determining a payment based upon a combination of cards included in the players' cards placed at the step (g); and (i) via the processor, giving a payment to the players in accordance with the determined payment.

11. The method of playing card games according to claim 10, further comprising the step of (j) accepting, via the processor, a side BET different from a normal BET, the step (h) including the step of determining via the processor a payment based upon a combination of the players' cards of players having accepted the side BET, among the players' cards, the step (i) including the step of giving via the processor a payment to the players having accepted the side BET.

* * * * *